(12) United States Patent
O'Leary et al.

(10) Patent No.: US 8,882,483 B2
(45) Date of Patent: Nov. 11, 2014

(54) CONTAINED FOAM ENVELOPE FOR INSULATING AND SEALING LARGE VOLUMES

(75) Inventors: Robert J. O'Leary, Newark, OH (US); William J. Grieco, New Albany, OH (US); Harry Alter, Granville, OH (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 578 days.

(21) Appl. No.: 13/192,563

(22) Filed: Jul. 28, 2011

(65) Prior Publication Data

US 2012/0263817 A1    Oct. 18, 2012

Related U.S. Application Data

(63) Continuation-in-part of application No. 13/087,413, filed on Apr. 15, 2011.

(51) Int. Cl.
| | |
|---|---|
| *B29C 44/58* | (2006.01) |
| *B29C 44/18* | (2006.01) |
| *E04B 1/76* | (2006.01) |
| *F16L 59/14* | (2006.01) |

(52) U.S. Cl.
CPC ............. *B29C 44/182* (2013.01); *E04B 1/7604* (2013.01); *E04B 1/7654* (2013.01); *F16L 59/143* (2013.01); *E04B 2001/7679* (2013.01)
USPC ........................................................ 425/4 R

(58) Field of Classification Search
USPC ......................................................... 425/4 R
See application file for complete search history.

(56) References Cited

U.S. PATENT DOCUMENTS

| | | |
|---|---|---|
| 3,307,318 A | 3/1967 | Bauman |
| 3,619,437 A | 11/1971 | McDonald, Jr. |
| 3,984,360 A | 10/1976 | Galbreath et al. |
| 4,155,208 A | 5/1979 | Shanabarger |
| 4,269,890 A | 5/1981 | Breitling et al. |
| 4,342,181 A | 8/1982 | Truesdell |
| 4,945,120 A | 7/1990 | Kopp et al. |
| 5,099,629 A | 3/1992 | Gay |
| 5,444,099 A | 8/1995 | Abe et al. |
| 5,699,902 A | 12/1997 | Sperry et al. |
| 6,267,261 B1 | 7/2001 | Lesage |
| 6,479,560 B2 | 11/2002 | Freitag et al. |
| 6,629,599 B2 | 10/2003 | Sperry et al. |
| 6,783,345 B2 | 8/2004 | Morgan et al. |
| 6,974,025 B2 * | 12/2005 | Bertram et al. ............... 206/219 |
| 7,341,317 B2 | 3/2008 | Platner et al. |

(Continued)

OTHER PUBLICATIONS

International Search Report and Written Opinion from PCT/US12/33297 dated Sep. 7, 2012.

(Continued)

*Primary Examiner* — Joseph S Del Sole
*Assistant Examiner* — John Robitaille
(74) *Attorney, Agent, or Firm* — Calfee, Halter & Griswold LLP

(57) ABSTRACT

A system for sealing or insulating a large volume is provided. The system includes an envelope having walls defining an interior. The interior is configured to receive a foaming composition. The envelope is initially configured in a retracted configuration. A foaming composition is configured for insertion into the interior of the envelope. The envelope is configured such that the foaming composition expands the envelope such as to fill a large gap.

30 Claims, 13 Drawing Sheets

(56) References Cited

U.S. PATENT DOCUMENTS

| | | |
|---|---|---|
| 2002/0092279 A1 | 7/2002 | Sperry et al. |
| 2004/0231743 A1 | 11/2004 | Keyes |
| 2005/0029148 A1 | 2/2005 | Rust |
| 2006/0047010 A1 | 3/2006 | O'Leary |
| 2008/0160203 A1 | 7/2008 | O'Leary et al. |
| 2008/0161430 A1 | 7/2008 | Korwin-Edson et al. |
| 2008/0161431 A1 | 7/2008 | Korwin-Edson et al. |
| 2008/0161432 A1 | 7/2008 | Korwin-Edson et al. |
| 2008/0161433 A1 | 7/2008 | Korwin-Edson et al. |
| 2009/0111902 A1 | 4/2009 | Korwin-Edson et al. |
| 2010/0175810 A1 | 7/2010 | Korwin-Edson et al. |
| 2011/0064876 A1 | 3/2011 | Grader et al. |

OTHER PUBLICATIONS

Office action from U.S. Appl. No. 13/087,413 mailed Feb. 12, 2014.
Office action from U.S. Appl. No. 13/087,413 dated Jun. 9, 2014.

\* cited by examiner

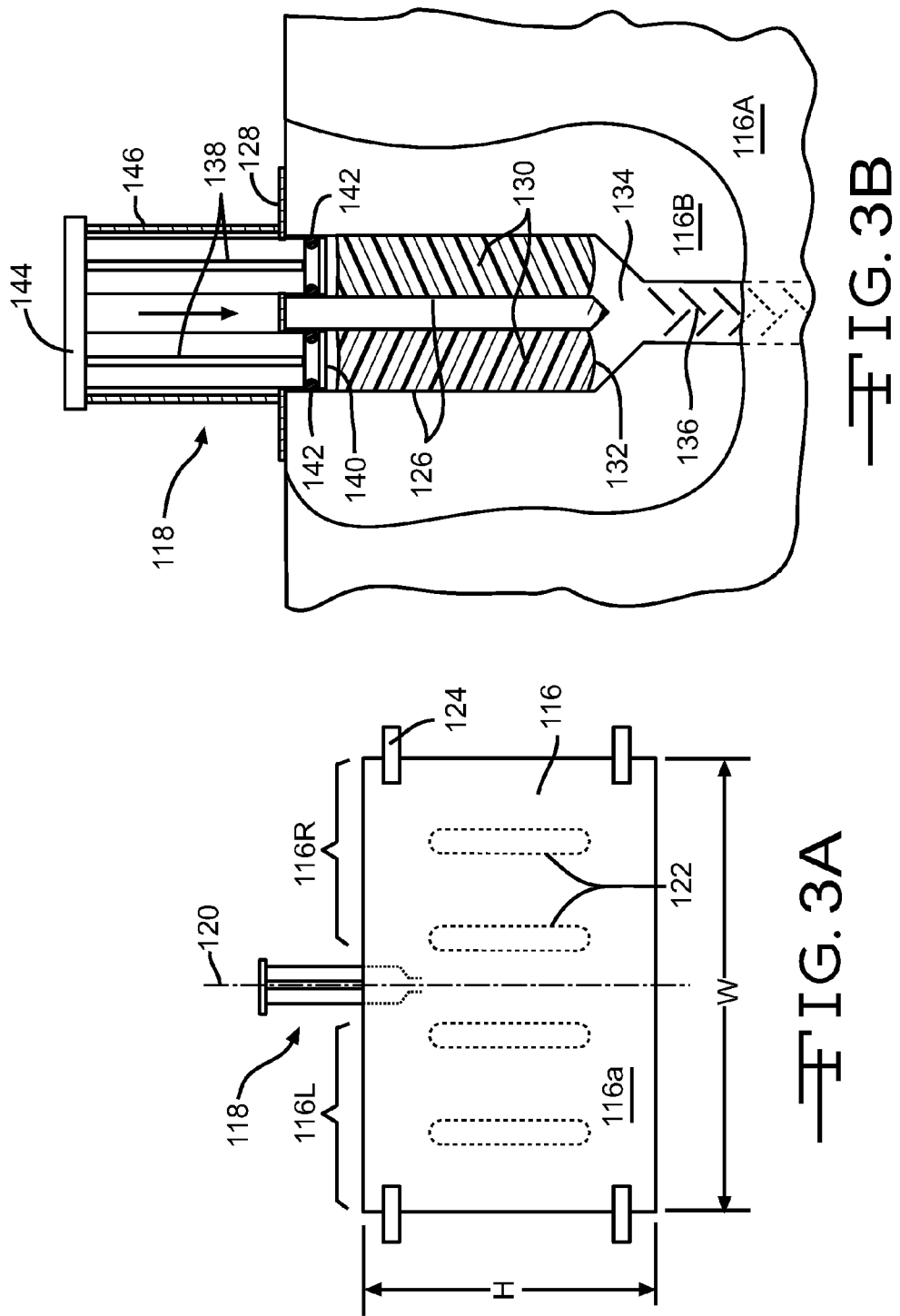

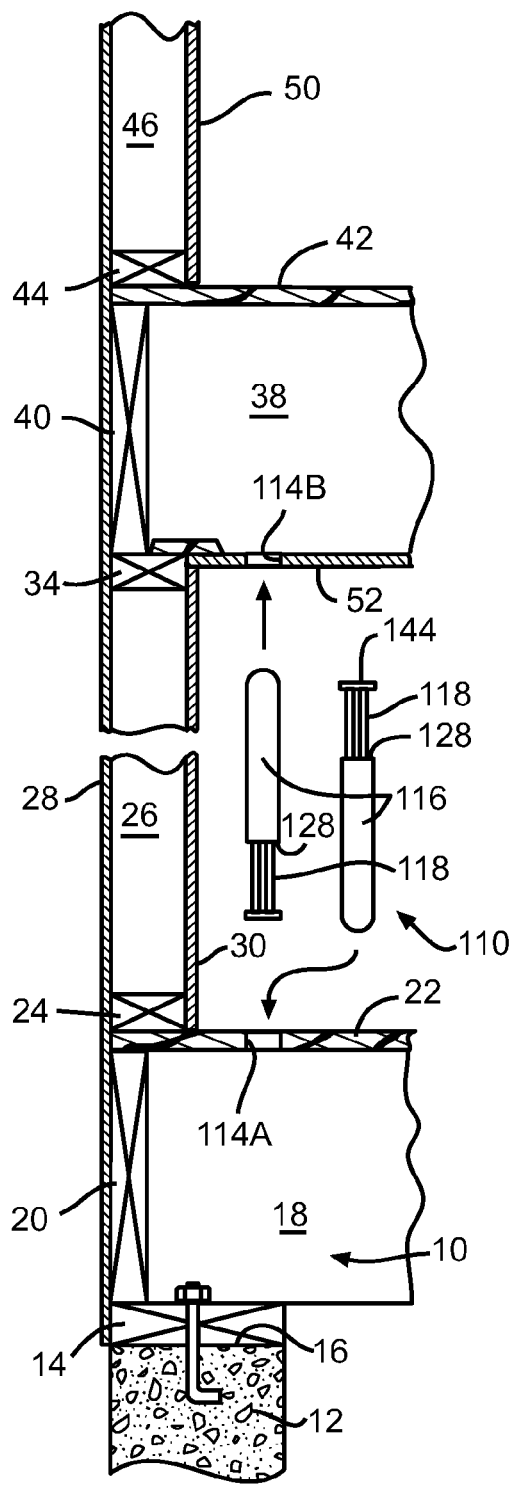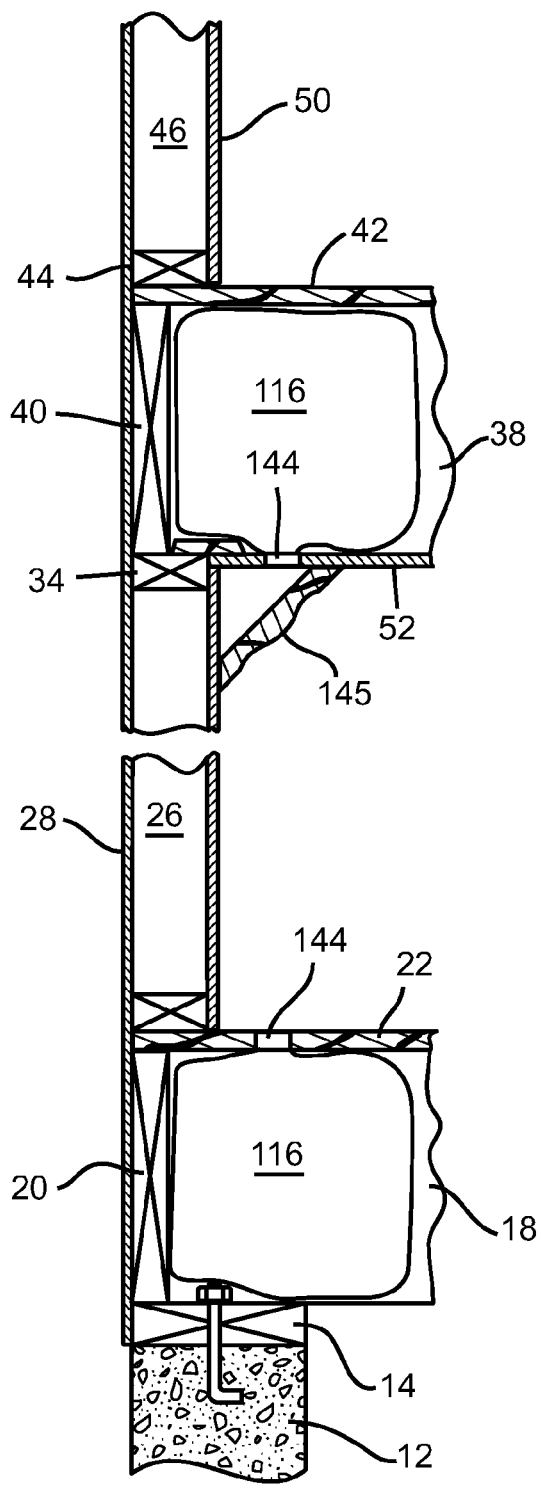

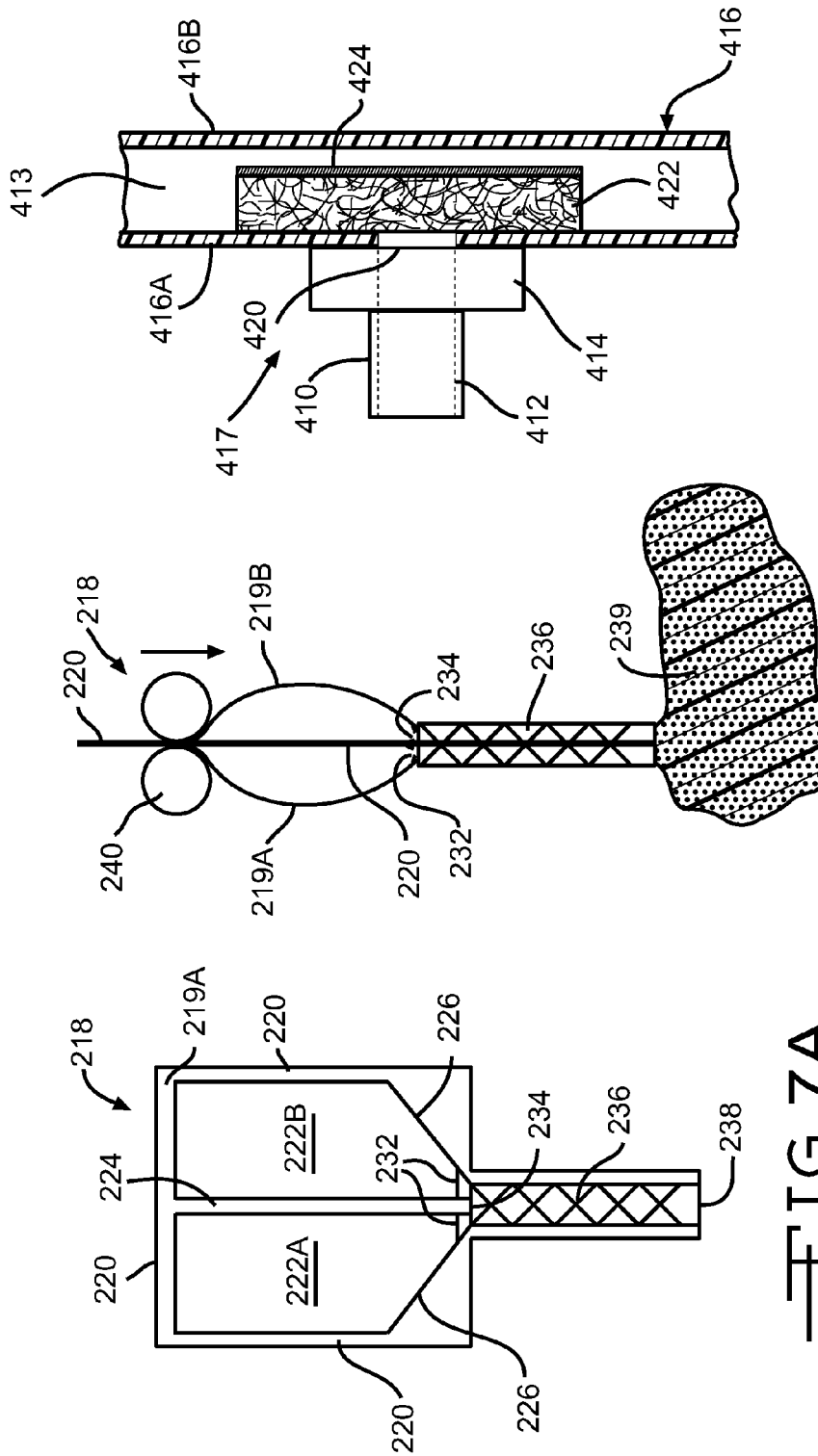

CONTAINED FOAM ENVELOPE FOR INSULATING AND SEALING LARGE VOLUMES

RELATED APPLICATIONS

This application is a continuation-in-part of U.S. patent application Ser. No. 13/087,413 filed Apr. 15, 2011, entitled "Contained Foam Envelope for Insulating and Sealing Large Volumes", which is incorporated by reference herein in its entirety.

BACKGROUND

The present invention relates generally to foams that are used to fill cavities, cracks, and crevices to enhance the sealing and insulating properties of buildings and, more particularly, to a foam that is contained within an enclosed envelope, such as a bag, that can conform to the large volume to be sealed.

Spray foams have found widespread utility in the fields of insulation and structural reinforcement. For example, spray foams are commonly used to insulate or impart structural strength to items such as automobiles, hot tubs, refrigerators, boats, and building structures. In addition, spray foams are used in applications such as cushioning for furniture and bedding, padding for underlying carpets, acoustic materials, textile laminates, and energy absorbing materials. Spray foams are also used as insulators or sealants for home walls.

Two main classes of spray foams are well characterized: polyurethane (non-aqueous) and latex (aqueous). Typically, polyurethane spray foams are formed from two separate components, commonly referred to as an "A" side and a "B" side, that react when they come into contact with each other. The first component, or the "A" side, contains an isocyanate such as a di- or poly-isocyanate that has a high percent of NCO (nitrogen, carbon and oxygen) functional groups on the molecule. The second component, or "B" side, contains nucleophilic reagents such as polyols that include two or more hydroxyl groups, silicone-based surfactants, blowing agents, catalysts, and/or other auxiliary agents. The nucleophilic reagents are generally polyols, primary and secondary polyamines, and/or water. Preferably, mixtures of diols and triols are used to achieve the desired foaming properties. The overall polyol hydroxyl number is designed to achieve a 1:1 ratio of first component to second component (A:B).

U.S. Pat. No. 5,444,099 to Abe et al., U.S. Pat. No. 4,945,120 to Kopp et al. and U.S. Pat. No. 3,984,360 to Galbreath et al. disclose polyurethane spray foams which may be capable of being applied at low temperatures. The polyurethane foams in each these patents require a polyisocyanate component.

Polyurethane foams can exhibit a number of problems when sprayed into cavities or crevices. First, they contain high levels of isocyanates, such as methylene-diphenyl-di-isocyanate (MDI) monomers. Secondly, the residual polymeric methylene-diphenyl-di-isocyanate (PMDI) that is not used has an NCO of about 20% and is considered to be a hazardous waste that can remain in a liquid state in the environment for years. Therefore, specific procedures must be followed to ensure that the PMDI waste product is properly and safely disposed of in a licensed land fill. Such precautions are both costly and time consuming.

In this regard, attempts have been made to reduce or eliminate the presence of isocyanate in spray foams and/or reduce or eliminate isocyanate emissions by spray foams into the atmosphere via the use of latex-based spray foams. Some examples of such attempts are set forth below.

U.S. Patent Publication Nos. 2008/0161430; 2008/0161431; 2008/0161433; 2008/0161432; 2009/0111902; and 2010/0175810 to Korwin-Edson et al. disclose a room temperature crosslinked latex foam, such as for filling cavities and crevices. The foam contains an A-side or component that includes a functionalized latex and a B-side or component that contains a crosslinking agent, and optionally, a non-reactive resin (e.g., a non-functionalized latex). Either or both the A-side or the B-side may contain a blowing agent package. Alternatively, the A-side and the B-side may each contain a component such as an acid and a base that together form a blowing agent package. A plasticizer, a surfactant, a thickener, and/or a co-solvent may optionally be included in either the A- and/or B-side.

U.S. Patent Publication No. 2006/0047010 to O'Leary teaches a spray polyurethane foam that is formed by reacting an isocyanate prepolymer composition with an isocyanate reactive composition that is encapsulated in a long-chain, inert polymer composition. The isocyanate prepolymer composition contains less than about 1 wt % free isocyanate monomers, a blowing agent, and a surfactant. The isocyanate reactive composition contains a polyol or a mixture of polyols that will react with the isocyanate groups and a catalyst. During application, the spray gun heats the polymer matrix, which releases the polyols and catalyst from the encapsulating material. The polyols subsequently react with the isocyanate prepolymer to form a polyurethane foam.

Such spray foams are excellent at sealing smaller cracks, joints and crevices, but generally do not possess sufficient structure to fill large volumes, such as the gap between floor joists where they intersect a wall dividing conditioned and unconditioned spaces, or the large gaps formed where a chimney passes through a floor joist or the large gaps found in furnace flue chases, for example. Although these spaces may be insulated with fibrous insulation, this is generally not sufficient to "seal" the area to prevent air drafts from infiltrating and passing from unconditioned areas to conditioned areas.

SUMMARY OF THE INVENTION

The above objects as well as other objects not specifically enumerated are achieved a system for sealing or insulating a large volume. The system includes an envelope having walls defining an interior. The interior is configured to receive a foaming composition. The envelope is initially configured in a retracted configuration. A foaming composition is configured for insertion into the interior of the envelope. The envelope is configured such that the foaming composition expands the envelope such as to fill a large gap.

According to this invention there is also provided a system for sealing or insulating a pipe or ductwork. The system includes an envelope having an inner skin and an outer skin configured for wrapping around the pipe or ductwork. The inner skin and the outer skin define an interior. The interior is configured to receive a foaming composition. The envelope is initially configured in a non-rigid structure. A foaming composition is configured for insertion into the interior of the envelope. The envelope is configured such that the foaming composition expands the envelope such as to form an insulation structure around the pipe or ductwork.

According to this invention there is also provided a system for sealing or insulating an insulation cavity formed between internal and external materials. The system includes an insulative batt positioned between the internal and external materials. The insulative batt has a first component of a foaming composition fused to a surface of the insulative batt adjacent the external material. An fitment port is configured to extend through the insulative batt and further configured to facilitate injection of a second component of the foaming composition. The first component of the foaming composition is configured to react with the second component of the foaming composition such as to form a layer of foam composition that seals with the exterior material.

According to this invention there is also provided a system for sealing or insulating an insulation cavity formed between internal and external materials. The system includes an insulative batt positioned between the internal and external materials. The insulative batt has a surface positioned adjacent the external material. A fitment port is configured to extend through the insulative batt and further configured to facilitate injection of a foaming composition. The foaming composition is configured to form a layer of foam composition that seals the insulative batt with the exterior material.

Various objects and advantages of this invention will become apparent to those skilled in the art from the following detailed description of the various embodiments, when read in light of the accompanying drawings.

BRIEF DESCRIPTION OF THE DRAWINGS

FIG. 3A is a front view of an envelope seal according to the invention

FIG. 3B is an enlarged, partly cutaway view of a portion of the envelope seal of FIG. 3A, and showing one embodiment of an activator for use with the invention.

FIGS. 4A and 4B are side views of an exterior wall as in FIG. 1, showing floor and ceiling installations of large volume envelope sealing devices. FIG. 4A shows the wall before installation and FIG. 4B shows the wall after installation and activation of the envelope seal.

FIGS. 7A and 7B show an alternate embodiment of an activation device; before and during activation.

FIG. 8 shows an alternate embodiment of an envelope seal, including a mixing matrix inside the envelope.

DETAILED DESCRIPTION OF THE INVENTION

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are described herein. All references cited herein, including published or corresponding U.S. or foreign patent applications, issued U.S. or foreign patents, and any other references, are each incorporated by reference in their entireties, including all data, tables, figures, and text presented in the cited references.

The term "R-value" is the commercial unit used to measure the effectiveness of thermal insulation and is the reciprocal of its thermal conductance which, for "slab" materials having substantially parallel faces, is defined as the rate of flow of thermal energy (BTU/hr or Watt) per unit area (square foot=$ft^2$ or square meter=$m^2$) per degree of temperature difference (Fahrenheit or Kelvin) across the thickness of the slab material (inches or meters). Inconsistencies in the literature sometimes confuse the intrinsic thermal properties resistivity, r, (and conductivity, k), with the total material properties resistance, R, (and conductance, C), the difference being that the intrinsic properties are defined as being per unit thickness, whereas resistance and conductance (often modified by "total") are dependent on the thickness of the material, which may or may not be 1 unit. This confusion, compounded by multiple measurement systems, produces an array of complex and confusing units the most common of which are:

| | English (inch-pound) | Metric/SI units |
|---|---|---|
| Intrinsic resistivity, r (conductivity, k, is reciprocal) | $\dfrac{hr * ft^2 * °F.}{BTU * in}$ | $\dfrac{K * m}{W}$ |
| Total material resistance, R (conductance, C, is reciprocal) | $\dfrac{hr * ft^2 * °F.}{BTU}$ | $\dfrac{K * m^2}{W}$ |

For ease of comparisons of materials of differing thicknesses, the building industry sometimes reports thermal resistance (or conductance) per unit thickness (e.g. per inch) effectively converting it to thermal resistivity (conductivity), but retains the traditional symbol, R or R-value.

Figure 1:
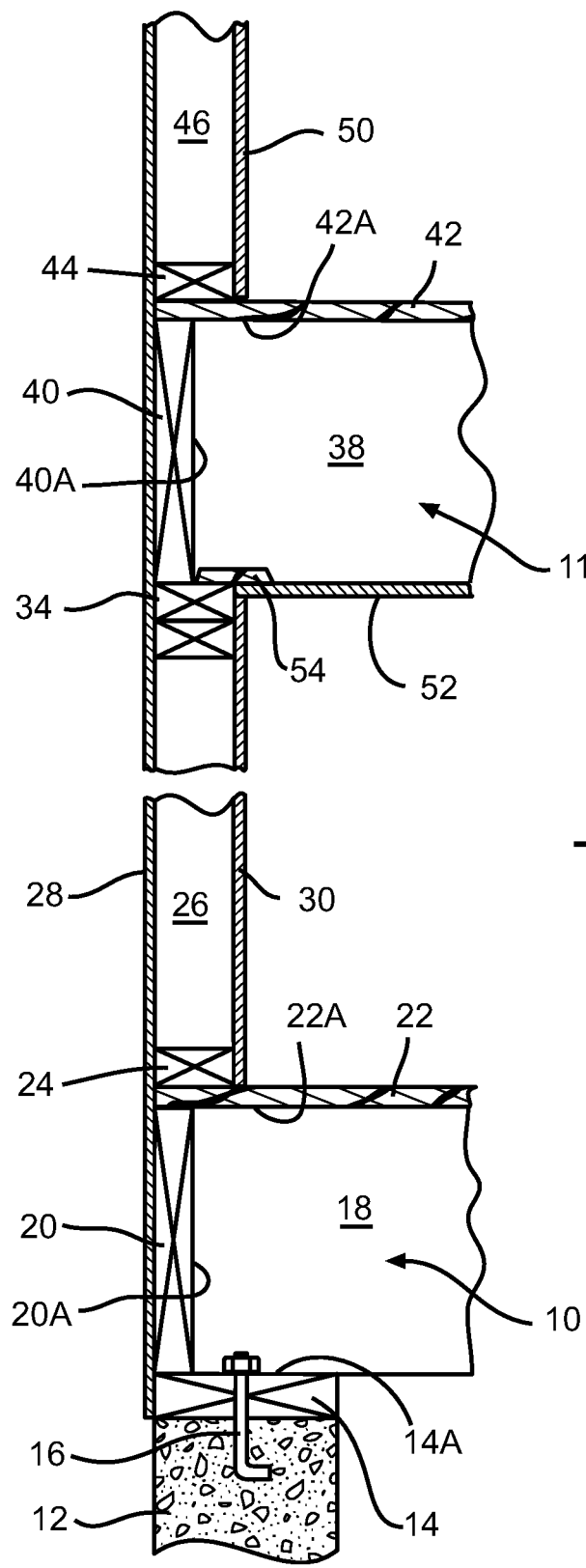
FIG. 1 is a side view of a typical exterior construction, showing the band joist areas of a ground floor and second floor.

FIG. 1 illustrates a typical construction of an exterior wall of a residential unit, although the invention is by no means limited to residential construction. It shows two examples of typical large gaps 10, 11 that can benefit from the invention. A foundation wall 12 is provided on a footing (not shown). A sill plate 14 is anchored to the top of the foundation wall 12, typically using an embedded bolt and nut arrangement 16. On top of the sill plate 14 rests all the flooring joists 18 (one shown) as well as the outer rim or band joist 20, shown in cross section. The joists 18 support the subfloor 22, on which rests bottom plate 24 to support studs 26 for an exterior wall. The exterior wall may include sheathing 28 and/or other coverings on the exterior side, and a wall panel such as drywall 30 on the interior of the unit. A large gap 10 exists the area between joists 18 and bounded by the upper surface 14A of sill plate 14, the interior surface 20A of band joist 20 and the under surface 22A of the subfloor 22. If the basement is finished, there may be ceiling material (not shown) fastened to the underside of joists 18 to provide an additional boundary of the large gap 10.

In similar fashion, a two-story unit has a similar large gap 11, shown in the upper part of FIG. 1. The studs 26 support a top plate 34, typically one or more 2x4s, on which are supported the upper story flooring joists 38 (one shown) as well as the outer rim or band joist 40, shown in cross section. The joists 38 support the subfloor 42, on which rests bottom plate 44 to support studs 46 for an upper story exterior wall. As with the lower story, the exterior wall typically includes sheathing 28 and/or other covering materials on the exterior side and a wall panel such as drywall 50 on the interior of the unit. The large gap 11 is the area between joists 38 bounded by the under surface 42A of the subfloor 42, the interior surface 40A of the band joist 40, and by the upper surface of top plate 34 and/or ceiling 52. In some cases, a scrap block 54 is fastened to the upper surface of the top plate 34 to provide an undersurface to which the ceiling 52 can be fastened. Thus the top surface of the top plate 34, the top surface of the block 54 or the top surface of the ceiling 52 all may potentially provide a lower boundary of the large gap 11.

Figure 2:
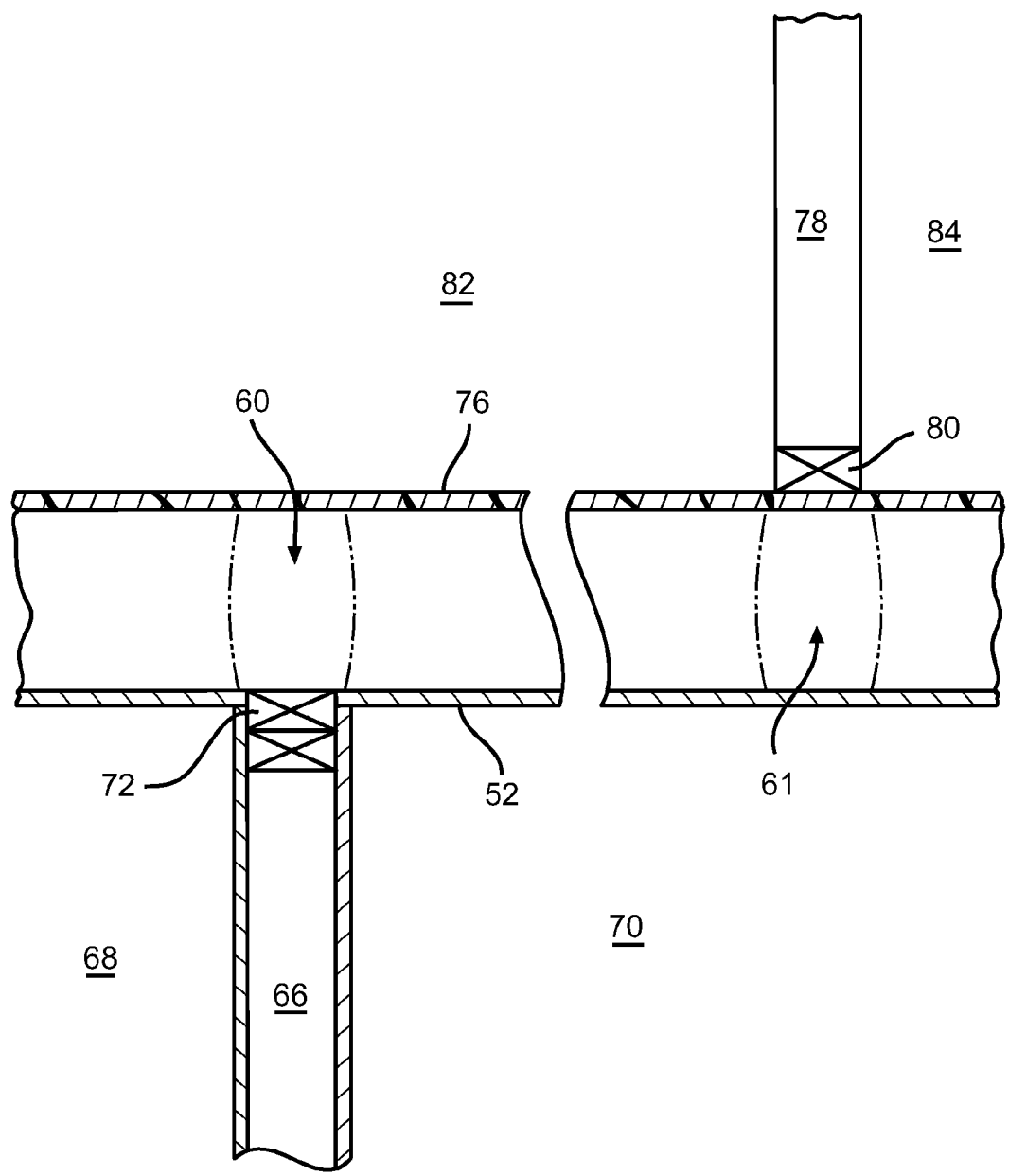
FIG. 2 is a side view of typical construction of an overhang or extension of second story living space over exterior or unconditioned garage space.

FIG. 2 illustrates additional types of large gaps 60, 61 that do not abut and are not bounded by a band joist. FIG. 2 depicts a wall 66, formed from stud framing, that divides conditioned space 68 (on the left side of the wall 66 shown in FIG. 2) and unconditioned space 70 (on the right side of the wall 66). The unconditioned space 70 may be, for example, a garage, a porch, a crawl-space or simply the exterior over which an overhang extends. Wall 66 terminates at its upper end with a top plate 72, upon which floor joists 74 extend to support the subfloor 76 of a second story. In a two story building, or even in the attic space of a one story building, subfloor 76 may support additional walls 78, built up from a sole plate 80, that divide conditioned space 82 from unconditioned space 84. The large gaps 60, 61 are thus the interjoist area between joists 74 bounded on the top by subfloor 76 and on the bottom by top plate 72 and/or ceiling 52. There is no band joist bounding the large gaps 60, 61 in a third dimension. For a discussion of sealing air leaks, large gap 60 may be viewed as the area that amounts to an extension of the wall 66 upward into the interjoist space; and large gap 61 may be viewed as the area that amounts to an extension of the wall 78 downward into the interjoist space.

It is customary in cooler climates to install insulation in the interjoist spaces between conditioned area 82 and unconditioned area 70. However, typical insulation does little to prevent air leaks and drafts from flowing through the interjoist spaces right along the floor joists 74. "Sealing" as used herein refers to the prevention or hindering of the movement of air such as drafts (i.e. convection) that can move through cavities, gaps, and poorly sealed seams whereas "insulating" refers to the prevention or hindering of all forms of heat transfer, including convection, conduction and radiation. Thus, sealing is a specialized case of insulating. Sealing is also important for noise reduction. The present invention addresses the shortcomings of using only insulation in interjoist spaces.

Some typical large volume areas are discussed above and illustrated in FIGS. 1 and 2. However, other large volumes may exist in home or building construction and also may benefit from the invention. For example, masonry chimneys often extend through a second floor and/or rafters. There frequently is a large gap between the masonry and the framing lumber. Additionally, chases are sometimes designed and built into homes for the passage of wiring, plumbing and exhaust flues. It is common to install water heaters and furnaces in the basement and to vent their exhaust gases through the roof, requiring a chase throughout all floors. The opening of the chase into the attic (or wherever it changes from conditioned to unconditioned space) represents another large gap that could and should be sealed against drafts and air leaks.

While the above examples of large volumes, cavities or gaps are given, it should be appreciated that these are not the only embodiments of large gaps. Large gaps do not have any particular minimum dimensions or shape, and other large gaps may also be envisioned and suitable for sealing using the envelope seals described herein. Generally, however, gaps or cavities are considered "large" if they encompass a volume of at last 6 cubic inches, more likely at least 12, 24, 48 or 64 cubic inches, and they may be as large as several cubic feet. Although discussed in terms of volume and cavities, the depth dimension is more applicable when additional R-value or insulation is desired. For sealing alone, a very thin envelope having just two dimensions is suitable, and one might describe it in terms of the area of the gap, but as a practical matter some insulation effect is often desired as well and the envelope will have some thickness and volume to provide this. Sealing or insulating or both are all aspects of the invention.

A large volume or gap is always bounded by a substrate on at least one side and usually, at least 2, 3 or more substrate/sides. Interjoist gaps are bounded by the two joists as well as one or more of a floor, a ceiling, a top plate, a sill plate and optionally by a band joist. Masonry gaps mentioned above are bounded by the masonry and a rafter or other framing structure as substrates. Similarly, a chase is bounded by substrate walls that form the chase. These substrates provide surfaces to which envelope seals may be lodged against or attached.

In some embodiments, the large volumes or gaps may not be in residential or building construction at all, but may occur in automotive, aircraft, marine or other vehicles, or in appliances such as dishwashers, dryers, ovens, refrigerators and the like. Any cavity, void or gap that needs to be sealed or insulated or both is potentially a large volume gap in accordance with the invention.

In order to fill and seal the large gaps described above, the invention provides in a first "integral" or "self-contained" embodiment an envelope or bag that already contains a quantity of a foaming composition that can be triggered externally to initiate a foaming reaction internally within the envelope to expand it to fill and seal the large volume. The foaming composition may be thought of as a "unit dose" for the intended envelope or container. Foaming compositions are described below. They are typically, though not necessarily, made in two parts which, like epoxies, are kept separated until ready for use. Activation triggers are used to combine the two parts to initiate the foaming reaction. In a different, "bulk" embodiment the bag or envelope does not initially contain the foaming composition or an activation device, but instead contains a fitment into which a foaming composition can be injected. The foaming compositions, if two-part, may be mixed in the delivery device just prior to injection into the envelope, or they may be delivered unmixed and mixed within a matrix inside the envelope. Several embodiments of the envelope or bag, including activation triggers and fitments, are described below in connection with multiple embodiments and with reference to the drawing figures.

Envelopes and Activators

Figure 9A:
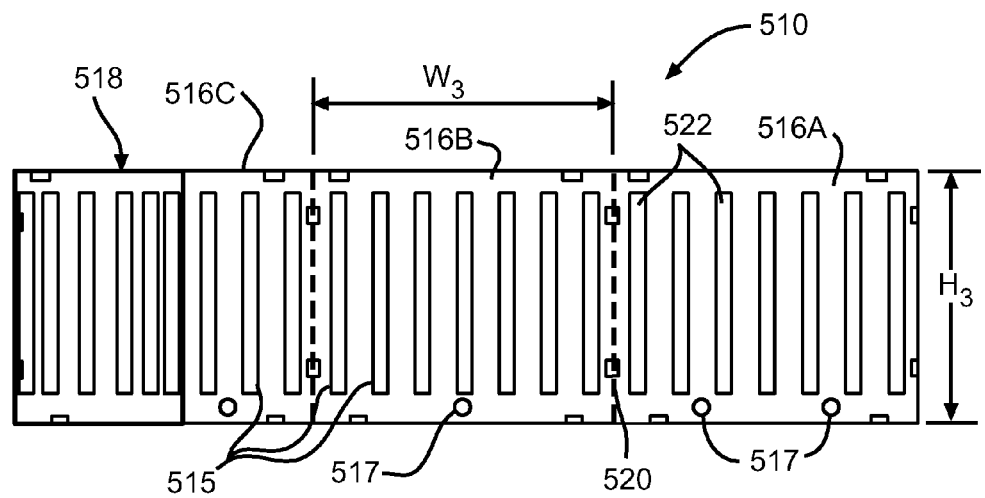
FIGS. 9A and 9B show variations of the envelope seal that include perforations for separating portions of the bag to improve the fit around specific spaces.
Figure 9B:
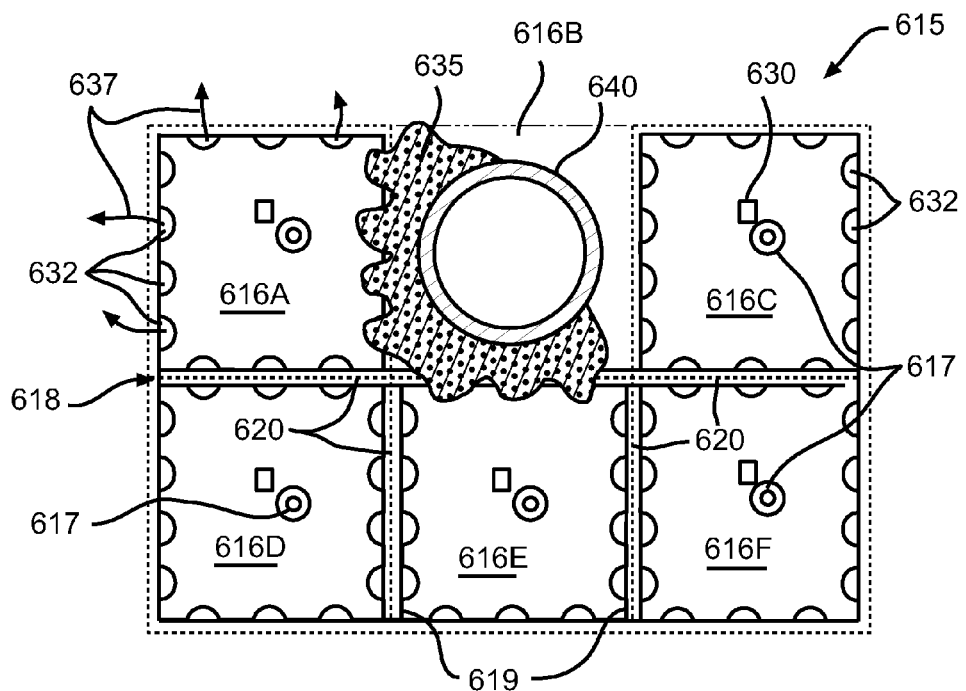

The term "envelope" is synonymous with bag, sac, bladder and similar terms that convey a sealed or sealable container with flexible walls. The envelope may be relatively flat, or it may have side walls or pleats to give it some depth when expanded. The envelope walls may be elastic and stretch to expand and conform to the volume space it is designed to fill, yet it should be strong enough to absorb the expanding foam in its interior without bursting. In some embodiments, the envelope walls may be sized and shaped to produce a gap filling envelope of specific dimensions and/or shape. At the same time, the foaming composition is matched in type and quantity to the specific envelope and is self-contained within or adjacent the envelope for an integral package. FIGS. 3 and 4 illustrate such an integral package. In other embodiments, the foaming composition and envelope are not integral and at least some of the foaming composition is added to the envelope through a fitment port as shown in FIGS. 6 and 8. In still other embodiments, the envelope is modular and able to be separated into sections along perforations or the like. FIGS. 9A and 9B illustrate such a modular envelope package.

The envelope may be made of any of a variety of plastic polymers, such as polyethylene, polyester (e.g. Mylar™), nylon or other polymeric material. In other embodiments, the envelope may contain intumescent materials to retard flame. In other embodiments, the envelope may be made of a bio-based material such as polylactic acid.

FIG. 3A illustrates an integral large volume sealing device 110 comprising an envelope 116 having a front side 116A and a back side 116B (not seen in FIG. 3A), and an activation trigger 118. The envelope 116 has a height, H, a width W, and potentially a depth, D, (not illustrated in this view). The activation trigger 118 is shown near a centerline 120 along the width W, dividing the envelope 116 into a right side 116R and a left side 116L. In some embodiments, portions of the front side 116A may be fused to the back side 116B as shown at areas 122 to create some structure to the envelope 116, as is described in more detail in connection with FIG. 6. The envelope 116 may include fastening flanges or straps 124 near its outer edges for fastening the envelope 116 to a substrate such as a joist. Staples, nails screws or any other fastener may be driven through the strap 124 to secure the envelope 116 to the substrate.

FIG. 3B is an enlarged and partly cut-away view of the activation trigger 118. In this embodiment, the activation trigger 118 resembles a dual barreled syringe, as is sometimes used with epoxies. Hollow syringe barrels 126 extend downward from a mounting plate 128 that is fused or sealed to a wall of the envelope 116, such that the syringe barrels 126 are within an interior of the envelope 116 between front side 116A and back side 116B. With common two-part foaming compositions, each syringe barrel 126 contains one part of the foaming composition 130. At the bottom of the syringe barrels 126 are lightweight "release seals" 132 that prevent the components of the foaming compositions 130 from touching each other until activated. Below the release seals 132—that is, further toward the interior of the envelope 116—the two syringe barrels 126 merge in a Y-shape junction 134, and then continue into a static mixer 136 before emptying into the interior of the envelope 116.

External to the envelope 116 at the mounting plate 128, plungers 138 extend into each syringe barrel 126, and terminate with a face 140 sealed against the inside of the syringe barrel 126 with a suitable seal such as an O-ring 142. At the top, the plunger 138 includes a pressure pad 144, or preferably a common pressure pad 144 configured to link the plungers 138 so they may be depressed simultaneously. To prevent premature activation during shipping and storage, a protective sheath 146 or cylindrical tube may be inserted between the underside of pressure pad 144 and the mounting plate 128 so that the plungers 138 cannot be inadvertently depressed until the protective sheath 146 is removed. Other embodiments of activation triggers 118 are described later, and would be equally suitable.

In use, the envelope 116 is installed in place in a large gap and optionally secured there using fastening straps 124. The protective sheath 146 is removed, and the plungers 138 are depressed into the syringe barrels 126, increasing the pressure until the release seals 132 rupture and the foaming compositions 130 begin to pass through the junction 134 and mix in the static mixer 136. As the components of the foaming composition mix, the foaming reaction is initiated and the foam begins to expand the envelope 116 to seal the large gap into which the envelope 116 was installed.

Static mixers are well known in the industry and require little additional description. Many operate by the principles of flow division (repeated stream splitting) and/or radial mixing (rotational circulation). Others operate by principles of turbulence or tortuous path flow. All are designed to blend two or more separate fluid mixtures into a more homogeneous product. Some static mixers are linear or "in-line" (FIGS. 3B, 5A and 5B) while others are matrix based (FIG. 8). Any static mixer, regardless of its principle of operation, may be used in the invention provided it affords sufficient mixing of components of the foaming composition to initiate a suitable foaming reaction for the size of the envelope. The static mixer may be part of the envelope system itself, as in the embodiment described above, but in other embodiments described herein the static mixer may be part of a delivery device instead.

Several typical installation methods are now described with reference to FIGS. 4, 5, and 6. FIG. 4A illustrates an exterior wall, essentially the same as FIG. 1, so parts described there are given identical reference numerals and are not described again here. In FIG. 4A, the large gaps 10, 11 are evident in the interjoist areas adjacent the band joists 20, 40. Two integral large volume sealing devices 110 are shown between the subfloor 22 and the ceiling 52. Each sealing device 110 comprises an envelope 116 and an activation trigger 118. In FIG. 4A, the envelope right and left sides 116R and 116L have been rolled about the centerline axis 120 (see FIG. 3) to form a small diameter cylindrical bundle. A hole 114A is made in the subfloor and a similar hole 114B is made in the ceiling 52 near the wall stud 26 (or drywall 30). The bundled sealing device 110 is inserted through the small holes 114A, 114B and into the large gaps 10, 11 respectively. When the mounting plates 128 are nearly in the holes 114A, 114B, the activation triggers 118 are depressed and the sealing devices 110 are pushed the remaining distance into the holes 114A, 114B such that the top pressure pads 144 are within and optionally fill and seal the holes 114A, 114B.

As the foam expands, the envelope 116 unrolls and expands until the sides of the envelope 116 begin to approach the joists 18, 38 on either side as well as the band joists 20, 40 on a third side. The envelope 116 expands up and down as well to occupy the large gaps 10, 11. As shown in FIG. 4B, the envelope 116 at the ground floor level is nearly fully expanded to contact and seal against the sill plate 14 and the subfloor 22, as well as the band joist 20 and flooring joists 18. As noted earlier, the plunger pressure pad 144 may seal the hole 114A or another sealant/cover may be installed and the flooring or carpeting (not shown) may be replaced over the hole 114A. The envelope 116 at the upper story floor is also shown in its nearly fully expanded state, pressing against the band joist 40, flooring joists 38, the subfloor 42 and the top plate 34 or ceiling 52. Following installation, the hole 114B may easily be concealed with crown molding 145 or with joint compound or plaster for refinishing and painting. Although only one interjoist gap is illustrated, it is to be understood that many will occur along any given wall since joists are generally placed on 16 inch or 24 inch centers. An integral large volume sealing device 110 is used to seal and insulate each of the large gaps 10, 11.

The shape and dimension of the integral large volume sealing device 110 may be made specific for the site and installation method. For example, in the installation described above with respect to FIGS. 4A and 4B, the height H of the envelope 116 may be 8, 10, 12 or more inches to correspond to the height dimension of the joists 18, 38. Envelope 116 may have a width W of from 14 to about 24 inches depending on the interjoist spacing and a depth D of from about 2-4 inches up to about 8-12 inches. However, these dimension ranges are specific for installation through a floor or ceiling as described. Other dimensions are suitable for other installations.

Figure 5A:
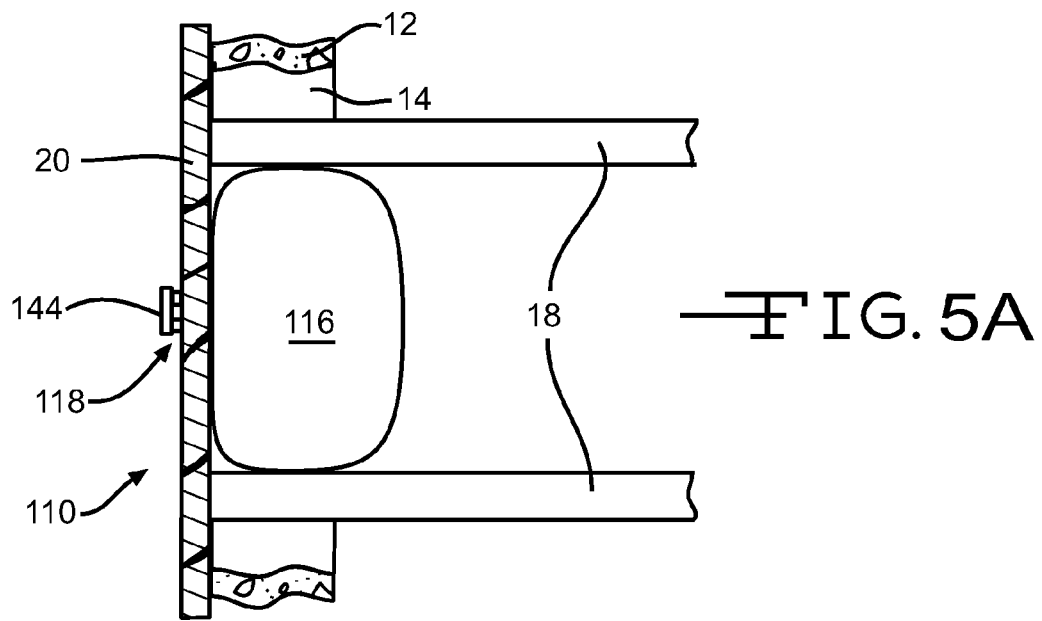
FIGS. 5A and 5B show alternative methods of installation to a band joist large gap area.

For example, in FIG. 5A, an alternate installation method is shown. The integral large volume sealing device 110 is similar to that described above. However, in this method, a hole is made in the band joist 20 from the exterior. The integral sealing device 110, with rolled envelope 116, is inserted into the interjoist gap, the activation trigger 118 is depressed and the foaming begins to expand to fill the envelope 116 and to press against the joists 18, the sill plate 14, the band joist 20 and the subfloor (not shown in this view). For this installation, the width W of envelope 116 corresponds to the interjoist dimension as before, but, since it is installed from the side rather than the top or bottom, the depth dimension correlates to the range given above for joist heights (e.g. 8, 10, 12 or more inches) and the height dimension H of the envelope 116 corresponds to the range described above for depth.

An external plunger has been described above as one means for triggering the foaming reaction. However, an "activation trigger", as used herein, encompasses any mechanism that can be operated from outside the envelope to initiate a foaming reaction inside the envelope. Thus activation triggers may operate one or more of a wide variety of physical principles such as: (1) mechanical motion, such as pulling, pushing, or leverage; (2) pressure differentials, such as air pressure from compressed air, manual pressure, pinch rollers, etc; (3) invisible waves, such as sound waves (e.g. ultrasound); electromagnetic waves (light, IR, UV, X-ray, microwave, heat, etc); and (4) electrical stimulus, such a voltage potential, shock, etc.

An alternative activation trigger 218 is shown in FIGS. 7A and 7B. Two layers 219A and 219B of a flexible foil or polymeric plastic are fused together along the edges 220 to create an interior 222. For two-part foaming compositions, the interior 222 may be divided into two compartments 222A and 222B by fusing a central pillar 224 as well. The compartments 222A and 222B may be tapered as shown by fusions 226 to a junction area 234 where the layers are joined and sealed to a static mixer 236. Lightweight release seals 232 keep the compartments 222A, 222B closed to the junction area 234 until use. The outlet 238 of the static mixer 236 is open to the interior of an envelope seal (not shown in FIG. 7).

Prior to use and fusing the layers 219a and 219B, the components of a foaming composition are sealed into the compartments 222A, 222B. In use, pressure is applied to the flexible layers 219A, 219B, such as for example by a pinch roller 240, to force the components of the foaming composition to rupture the release seals 232 (FIG. 7B) and to push the foaming composition into the junction 234 and then to static mixer 236. Eventually, the mixed foaming composition 239 is forced out the outlet 238 into the interior of the envelope where it begins expanding the envelope as described above. The pressure applied to activate the activation trigger 218 may also come from manual manipulation of the activation trigger 218 or from a source of compressed air.

The activation trigger 218 will be associated with an integral package envelope like 116 with at least the outlet 238 being sealed inside the envelope interior. Alternatively, the entire static mixer 236 or even the entire activation trigger 218 may be within the envelope in some embodiments. It can still be activated from the exterior by applying sufficient pressure to the trigger. In such cases, it may be desirable to include delayed catalysts in the foaming composition so that the foaming reaction can be triggered on a bench prior to installation, and the delay allows sufficient time to install the envelope in the gap before the foaming reaction gets underway.

Other Embodiments and Variations

In general, the integral-type large volume sealing device 110 described above is particularly well suited for retrofit applications, although it may also be used in new construction. It is easy to use, even for the 'do-it-yourself' population, since the prescribed quantity or dose of a foaming composition is self contained within or adjacent the envelope and can be activated from outside the envelope to initiate the foaming reaction. However, the additional costs associated with the triggering device make this a more expensive choice for the professional contractor doing bulk insulation, particularly in new construction where interjoist gaps and other gaps may be more accessible. For these users and applications, another package may be preferable, although either type package may be used in either application. An alternative embodiment comprises an envelope having, instead of a foam-filled activation device, a port or fitment through which bulk foaming composition may be delivered to the envelope interior. A delivery device for injecting bulk foaming composition is dimensioned to attach to the fitment port and to pump bulk foaming composition into the envelope. To distinguish this from the "integral package" embodiment, this embodiment is referred to herein as the "fitment" embodiment or "bulk" embodiment.

Figure 5B:
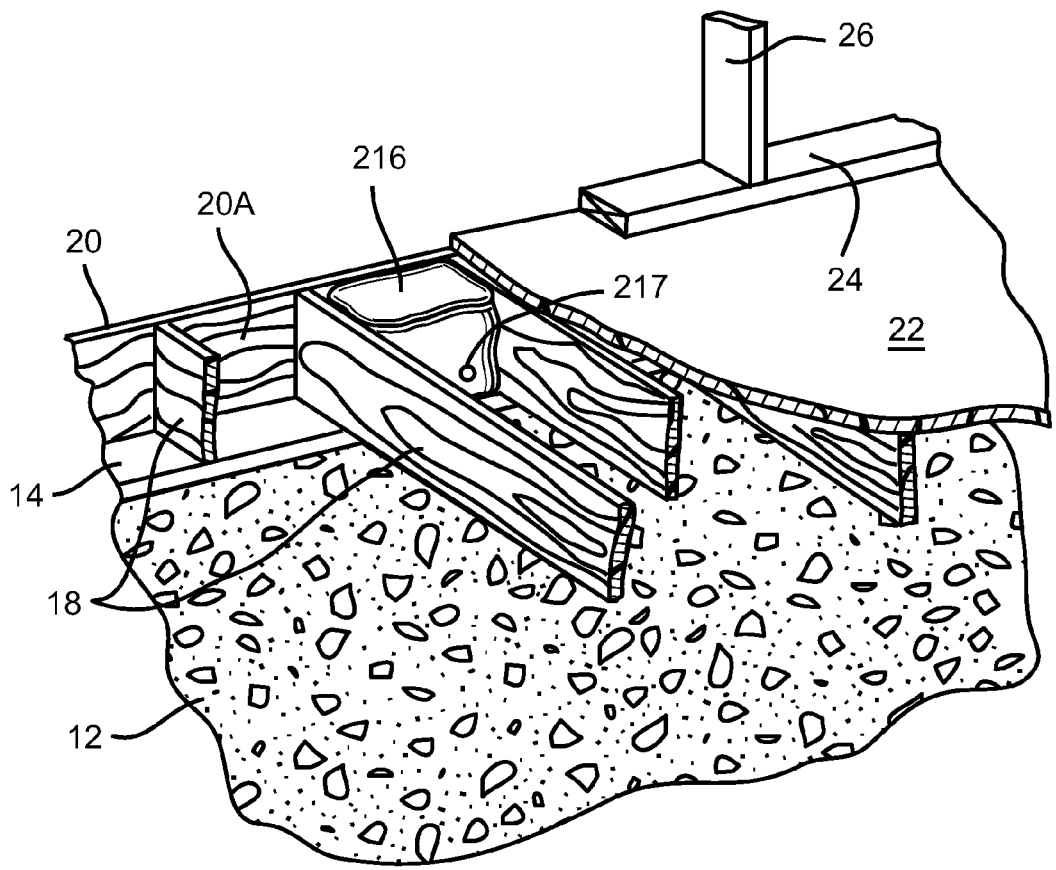

The bulk embodiment is described below in connection with FIG. 5B, which illustrates a foundation 12 on which sits a sill plate 14. As before, the sill plate 14 supports band joist 20 and flooring joists 18 which, in turn, support subfloor 22. However, when the building has an accessible crawlspace or basement below the flooring joists 18 and the joists are exposed, it is possible to install envelope seal 216 into the interjoist space from below without making any holes in the subfloor 22 or band joist 20. Consequently, envelope seal 216 may comprise an integral package seal, containing its own foaming composition and an activation trigger, or it may comprise a bulk embodiment having a port or fitment through which bulk foaming composition can be injected into the envelope. Fitment port 217 is shown in FIG. 5B. Fitment ports generally are described in more detail below.

Figure 6A:
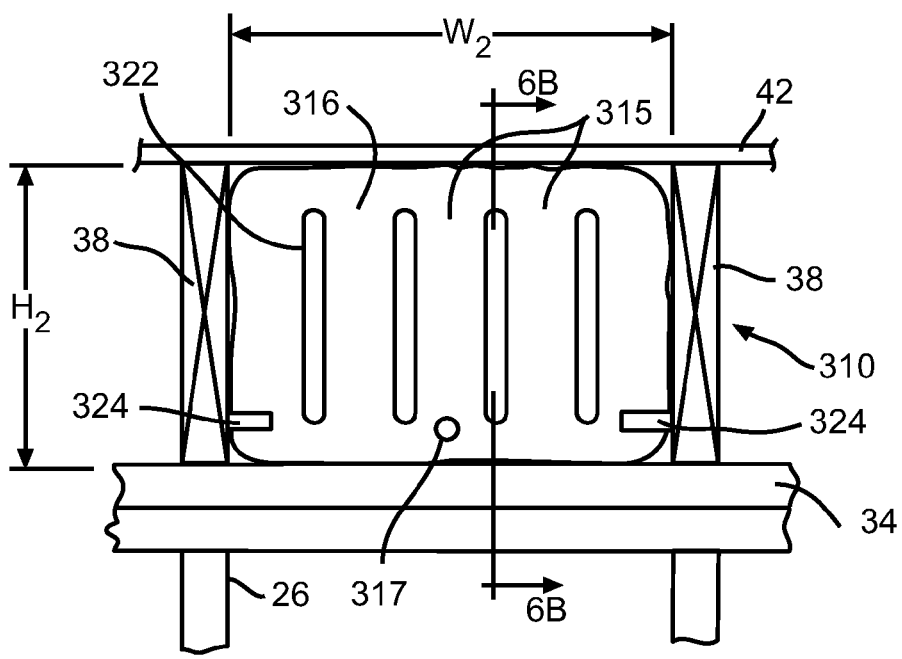
FIG. 6A is a front view of an alternate embodiment of the envelope seal.
Figure 6B:
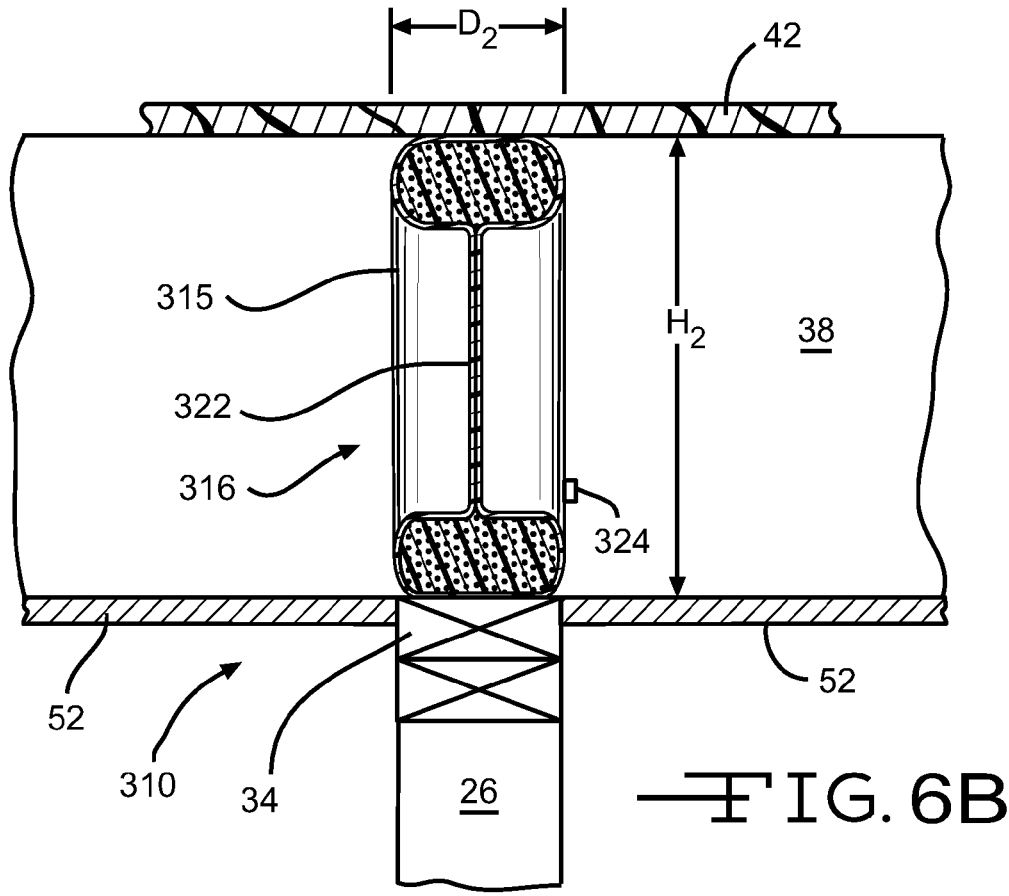
FIG. 6B is cross sectional view of this embodiment taken along line B-B of FIG. 6A.

FIGS. 6A and 6B illustrate another embodiment of an envelope seal 310 for sealing a large volume. The envelope seal 310 is similar to the envelope seal of FIG. 3A, but it lacks an activation trigger. It comprises an envelope 316 having a front and back side, a height H2, a width W2, and optionally a depth D2. It may comprise flanges or straps 324 for securing the envelope 316 to a substrate, such as flooring joists 38. As with the embodiment of FIG. 3A, the envelope 316 may comprise areas 322 where the front and back walls or panels of the envelope are fused together. Such fused areas help give shape and strength to the expanded envelope as seen in FIG. 6B. As before, when the envelope 316 is expanded, it seals against the joists 38, the top plate 34 or ceiling 52, and the subfloor 42. Notably, no band joist is shown, as this Figure illustrates the "wall extension" type of installation to fill large gaps 61, 62 as described above in connection with FIG. 2. It should be appreciated, however, that this embodiment is not limited to installation for this type of gap and is equally well suited to band joist or other large gaps.

Instead of an activation trigger, this embodiment is the "bulk" or "fitment" type and has a fitment port 317 on an exterior face of the envelope 316 which communicates to the interior. Fitment ports may vary, but a simple design consists of a hollow cylindrical piece of plastic or polymer with a flange that allows it to seal against the envelope 316 (see also FIG. 8). The main constraint is that fitment ports can, with or without the use of adapter sleeves, tightly interact and seal with a nozzle or barrel of a bulk foaming composition delivery device. For example, a nozzle of a delivery gun may be cylindrical, and the fitment is a hollow cylinder dimensioned to receive the nozzle and tightly seal against it so that bulk foaming composition is delivered to the interior of envelope 316 without leaking or spilling. A slight tapering of the fitment wall or the device nozzle may enhance the seal. Fitment port 317 may contain a valve (not shown) for allowing entry but preventing egress of bulk foaming composition; and it may contain deflectors or baffles (not shown) for directing the injected foam to various areas of the interior.

When expanded, the envelope 316 includes tubular ribs 315 separated by the fused areas 322 as best seen in FIG. 6B. This arrangement provides additional strength and, by limiting depth D2, urges the expanding envelope outward against its substrates (e.g. subfloor 42, top plate 34 and flooring joists 38) for a better seal instead of allowing the foam to expand the envelope 316 laterally into the interjoist spaces. Additionally, in any of the embodiments described herein, the envelope 316 may include leak pores or perforations (described below in connection with FIG. 9B) around the perimeter of the envelope 316. Such leak pores allow small amounts of foam to seep out of the interior to ensure a good seal against the substrate all around the envelope 316.

In the simple fitment port 317 described above, the foaming composition—if a two-part composition—must be mixed prior to entering the fitment port 317. This is also true of traditional two-part spray foams so existing delivery devices are generally capable of drawing up components from two sources, pumping them to a location, and mixing them in a delivery gun just before they are applied to a site. Such delivery guns are known in the art and are suitable for use to inject foaming compositions into envelopes with simple fitment ports like 317. The nozzle of the delivery device is generally cylindrical and can be inserted into the cylindrical fitment port. Adapters may be used if needed to ensure tight fits with no leakage of foaming composition. Simple friction fits are generally sufficient, although more complex bayonet mounts or screw mounts are possible and within the purview of the invention.

FIG. 8 shows in cross section an alternate fitment port 417 that does not require the components of the foaming composition to be mixed prior to entry into the fitment port. Thus it keeps delivery gun nozzles free of mixed foaming composition, rendering them easier to clean after use. Fitment port 417 comprises a cylindrical flanged plastic part 410 fused to one wall (416A) of an envelope 416 of construction similar to that previously described. Flanged part 410 consists of an annular or tubular wall 412 hollow throughout, molded to a flange 414 to provide a base for fusion to the front wall 416A of envelope 416. Envelope front wall 416A includes an opening or hole 420 in registry with the hollow core of the annular wall 412. On the interior side of envelope front wall 416A, a fibrous matrix 422 is fixed in the area where the flanged part 410 opens through hole 420 into the interior 413 of the envelope 416.

The fibrous matrix 422 may be made of polymer or inorganic fibers and may be bonded fibers or woven or non-woven fibers. It will be sized appropriately for the envelope size and quantity of foaming composition, to provide a mixing effect for foaming composition components that are injected through the fitment port into the matrix. Baffles or diverters (not shown) may be employed to direct foaming composition through a sufficient tortuous path of the fibrous matrix 422 to effect the necessary mixing. In particular, an impervious barrier layer 424 of polyethylene or the like may be applied to the face of the fibrous matrix that is furthest from the envelope front wall 416A. This helps control the flow path of the foaming composition to direct it perpendicular to the flow through the fitment wall 412, so that it flows through more of the fibrous matrix 422 and improves mixing. Additionally, the fibrous matrix 422 provides some separation of the back wall 416B from the front wall 416A.

FIG. 9A illustrates a further embodiment of an envelope seal 510 produced in bulk. Individual envelopes 516A and 516B are shown attached together at perforation tear line 520, which may also include a fused seam border along the perforation tear line 520. In likewise manner, envelope 516B is attached to envelope 516C, etc as roll 518 to the left in FIG. 9A suggests. Each envelope on the roll 518 has a height H3 and a width W3, and optionally a depth D3, not shown. The width W3 corresponds to the spacing between perforation lines 520. Depending on the embodiment, the front and back side may be fused in areas 522 to create ribs 515 as described in connection with FIG. 6. Lo-rise fitment ports 517 may be added for the purpose of injecting a foaming composition or component(s) thereof. One or two fitment ports 517 are shown per envelope, for example. They may be similar to other fitment ports described, except that, for producing a rolled product, the depth of the port should be minimized to reduce bulk. Thus, low-rise fitments are preferred.

This roll product is easily manufactured in long webs of intermittently fused layers, and rolled for shipping and storage. In use, one simply unrolls the web, separates an envelope along a perforation line, secures it to the desired substrate and connects a source of foaming composition to the fitment through a delivery device as described above. As with prior embodiments, the envelope 516 may be made in standard heights and width to fit conventional gap areas. Alternatively, by spacing the perforation lines 520 closer together (more frequently), the roll may be produced with fractional widths W3, such that multiple envelopes are used to fill a large volume. This modular approach offers more flexibility in filling gaps of varying sizes. In another variation, the roll may omit the perforation lines 520 and the user simple cuts the envelope to length along any fused area 522. Since the fused seam is no longer present, this variation produces an envelope that is open at the cut end along the top and bottom. This area may be fused manually, or it may be left open so that foam may extrude from this opening to further seal corner areas of a large gap and to further secure the envelope in position attached to the substrate such as a joist.

An alternative modular embodiment is illustrated in FIG. 9B. In this embodiment the envelope seal 615 is designed to be modular so as to fit irregular spaces better. One example of such an irregular space is where a duct or pipe extends through a band joist, as is the case, for example, with a dryer vent or a high efficiency furnace air intake and exhaust. Each envelope seal 615 is made up of a plurality of smaller segments 616 that are attached together much like a quilt. In reality, during manufacturing, a web of envelopes is manufactured and divided into segments 616 by fusing a seam 618 in a machine direction, and a seam 619 in a cross-machine direction, although these machine directions are arbitrary to the final orientation of the envelope seal 615 shown. Within the width of each fused seam 618, 619 a perforation line 620 is inserted, so that a portion of the segments 616 can be separated from the others in order to fit an irregular space.

In the specific embodiment illustrated in FIG. 9B, six segments 616A-F are removed from the bulk web in a 2×3 matrix in order to fill a volume such as a joist gap. However, to fit the envelope seal 615 into an irregular volume in which a pipe 640 extends, the upper center segment 616B (shown in phantom) is separated from the other segments 616A and 616C-F to make room for pipe 640. "Separated" in this context encompasses complete removal of the unused segment as well as partial removal by making tears or cuts along perforations or not to make room for the obstruction that makes the space irregular. For example, segment 616B might be separated along the perforations between 616B-616C and between 616A-616B, and hinged downward along the perforation seam 618 between segments 616B and 616E. Alternatively, a cut may be made down the center of absent segment 616B, and the 616B-616E perforation may be separated so that each half opens like two doors folding behind segments 616A and 616B. Finally, segment 616B may be separated from all three remaining sides and removed, as is the case represented in FIG. 9B.

Envelope segments 616A-F all include a fitment port 617 as was described previously for injecting a foaming composition to the interior of envelope. Since the volume of each segment 616A-F is relatively small, it may be useful to provide a keying means to inform the delivery device how much volume to inject. RFID tags 630 can be used to convey this information to the delivery device.

In some embodiments, it may be desirable to provide strategic "leak" pores in the envelope. In FIG. 9B these leak pores take the form of arcs 632 that represent small holes punctured in the envelope wall. As with the cut end of the envelope 516 described above, leak pores like this allow the foam to extrude in a controlled fashion to further seal the gap and secure the envelope in place. In FIG. 9B, foam 635 is shown extruding from the right side of segment 616A and from the top of segment 616E to further seal the space around the pipe 640. Once the foaming composition is injected and begins to expand, it would also extrude from all of the other pores or arcs 632 as represented by certain arrows 637, but not shown as foam. The amount and type of foam used is desirably chosen so that these strategic leak pores further seal the gap area, further secure the envelope in place and potentially even add insulation value and strength to the envelope. As other segments 616 are filled (E.g. 616C and 616F) they too would ooze or extrude foam via the arcs 632 to complete the seal of the gap around the pipe 640, to further secure the envelope in place, and to further strengthen and insulate the seams 618, 619.

The choice of size of the segments is simply one of tradeoffs. The smaller the size of each segment, the greater the flexibility in shaping the envelope to fit an irregular volume. The concept is much that same as resolution of a monitor—the more pixels, the higher the resolution of the image. The tradeoff is that there are more ports to fill with even smaller quantities, thus contributing to labor costs. Balancing this tradeoff is within the purview of those skilled in the art to design reasonable flexibility with minimal labor time and expense. For typical interjoist gaps, the number of segments may range from 1 to about 24, more likely from about 1 to about 12 segments. However, the number is not critical and will certainly vary for other types of large volumes.

Foaming Compositions

The foams that may be used within the envelope may be of any of the known types of foaming compositions, including both open and closed cell foams. Generally speaking, foaming compositions include two reactive film-forming ingredients; a structure, scaffold or skeleton former; and a blowing agent. Other additives may be present of course as is taught in connection with known foaming compositions. The foams may be one-part, but reactive components must be kept separated until ready to initiate the foaming reaction. An easy way to keep the reactive components separated until desired is to package them in separate compartments or containers, which gives rise to description in the literature of "two-part" foaming compositions. Any of the one-part or two-part foams described in any of the following references, each of which is incorporated in its entirety by reference, can be used with the present invention.

U.S. Pat. No. 5,444,099 to Abe et al., U.S. Pat. No. 4,945,120 to Kopp et al. and U.S. Pat. No. 3,984,360 to Galbreath et al. disclose polyurethane foams.

U.S. Patent Publication Nos. 2008/0161430; 2008/0161431; 2008/0161433; 2008/0161432; 2009/0111902; and 2010/0175810 to Korwin-Edson et al. disclose latex foams.

U.S. Patent Publication No. 2006/0047010 to O'Leary discloses a polyisocyanate prepolymer foaming composition.

U.S. patent application Ser. Nos. 12/875,640, filed Sep. 3, 2010 and 61/421,680 filed Dec. 10, 2010 to O'Leary disclose non-aqueous based foaming compositions that will nevertheless foam at room temperatures.

The availability and low cost of isocyanate/polyol reagents that make low density polyurethane foams are well suited for use with the present invention. They are well tested and understood in the industry and make low density open cell foams in the 0.25 to 3 pound per cubic foot (pcf) range. While these foams have been avoided for spray applications, due to health concerns related to inhaling dangerous vapors, these dangers are removed or minimized in the present invention for two principle reasons. First, the foam is not sprayed or atomized so that it is more difficult to inhale. Even in the embodiment where a delivery gun or device is used, the foam is injected directly into the interior of the envelope and does not generally escape to the atmosphere. Second, the foam is largely self-contained within the envelope. Although some embodiments have strategic leak pores that allow some foam to escape, these are placed at the perimeters of the envelopes so that the foam has time to polymerize and set up before leaking to the exterior. In this way no toxic monomeric NCO's are likely to escape.

The foaming composition may contain other optional ingredients, in either or both of an A-side and B-side when two-part foams are used. Such optional ingredients may include catalysts, a nucleating agent, coagulation agents, foam promoters, opacifiers, accelerators, foam stabilizers, dyes (e.g., diazo or benzimidazolone family of organic dyes), color indicators, gelling agents, flame retardants, intumescents, biocides, fungicides, algaecides, fillers (aluminum trihydroxide (ATH)), and/or blowing agents. It is to be appreciated that a material will often serve more than one of the aforementioned functions, as may be evident to one skilled in the art. The additives are desirably chosen and used in a way such that the additives do not interfere with the mixing of the ingredients, the cure of the reactive mixture, the foaming of the composition, or the final properties of the foam. Other optional additives can be between 0 and 10% of the final formulation.

Some specific flame retardants include: Triethyl Phosphate TEP, Tributoxyl Ethyl Phosphate (TBEP), Tri-isobutyl Phosphate (TIBP), Tris (2-Chloroisopropyl)Phosphate (TCPP), Tris(1,3-dichloro-2-propyl)Phosphate (TDCP), Triphenyl Phosphate (TPP), Tricresyl Phosphate (TCP), Triphenyl Phosphite, Triphenyl Phosphine, Tris (2-chloroethyl)Phosphate (TCEP), 1-Phenyl-3-Methyl-5-Pyrazolone (PMP), Acetoacetanilide (AAA, and Phosphate Flame Retardants BDP and RDP.

As mentioned earlier, for some embodiments it may be desirable to delay the onset of the foaming reaction once the trigger is activated. Some types of activation triggers may be used after the envelope is installed, while other types may be used on a bench or surface just prior to installation. In the latter case, delaying the onset of foaming to allow time to install the envelope may be desired. Certain modified catalysts can do this. Notably, to create a delayed action, formic acid can be added to either a gel catalyst such as TEDA—Triethylene amine or DBTDL—Dibutyltindilaurate; or to a blowing catalyst such as BDMAEE—bis(2-dimethylaminoethyl ether) or DMDEE—2,2' Dimorpholinodietyl ether.

In exemplary embodiments, the foams of the present invention, as well as the components thereof, meet certain performance properties, or Fitness for Use ("FFU") criteria, both chemical and physical. In particular, desired criteria or FFUs that the inventive foam should meet are set forth in the table below:

| Chemical Criteria | Physical Criteria |
|---|---|
| The foam should adhere to various materials such as wood, metal, concrete and plastic | The foam weight should be between about 0.2 and about 4.0 pounds per cubic foot |
| The chemical constituents should be safe. Even though isocyantates may be used, the dangerous monomeric NCOs are not introduced or atomized into the air where they can be inhaled; even if they extrude from the leak pores, they are substantially polymerized by then. | The foam should be fluid enough to be sprayed either at room temperature or by heating (viscosity of <10,000 cP at a high shear rate) |
| | The foam should not sag or fall in the cavity |
| | The foam should fill in cracks and crevices or be used to coat the cavity with an air barrier |
| The foam may be chemically foamed through the use of a blowing agent or it may be mechanically foamed with a gas | Ideally, the cell structure of the foam (closed vs. open) should be open cell structure to provide appropriate material density properties and avoid volatile blowing agents |
| The installer of the foam should be able to work with the material without any specialized personal protective equipment ("PPE"), such as a breathing apparatus, although chemical goggles, dust mask, and gloves are acceptable | The foam should have a thermal resistance (R-value) of at least 3.0° Fft$^2$h/BTU per inch |
| | The foam should be non-sagging and non-dripping (i.e., fire retardant) during a fire |
| The foam should not lend itself to molding or fungus growth (ASTM C1338) | The foam should not corrode metal objects such as screws, nails, electrical boxes, and the like |
| The foam should not contain a food source for insects or rodents | Air infiltration should be negligible (ASTM E283-04) (spec 0.4 cfm/sq ft) |
| There should be a minimum shelf life of the un-reacted constituents of 9 months. | Water vapor infiltration should be greater than 1 perm or 5.72 × 10$^{-8}$ g/Pa-s-m$^2$ |
| | The foam should have low or no odor. |

Methods and Process

The final foamed product becomes cured to the touch within minutes after application, and hardens within about 1 to 6 minutes. In foams intended for use as insulating materials, the resulting resistance to heat transfer, or R-value, is desirably from about 3.5 to about 8 per inch. In certain uses, the foamed product has an integral skin that restricts the passage of air but permits the passage of water vapor.

Another advantage of the foams of the present invention is the safe installation of the foam into cavities. Because the foams do not release any harmful vapors into the air when applied or sprayed, the inventive foams reduce the threat of harm to individuals working with or located near the foam. In addition, the application of the foams is more amenable to the installer as he/she will not need to wear a special breathing apparatus during installation.

Another advantage of the inventive foams is that it can be used in the renovation market, as well as in houses that are occupied by persons and/or animals (e.g. renovation market). Existing spray polyurethane foams cannot be used in these applications because of the generation of high amounts of free isocyanate monomers that could adversely affect the occupants of the dwelling. As discussed above, exposure of isocyanate monomers may cause irritation to the nose, throat, and lungs, difficulty in breathing, skin irritation and/or blistering, and a sensitization of the airways.

Figure 10:
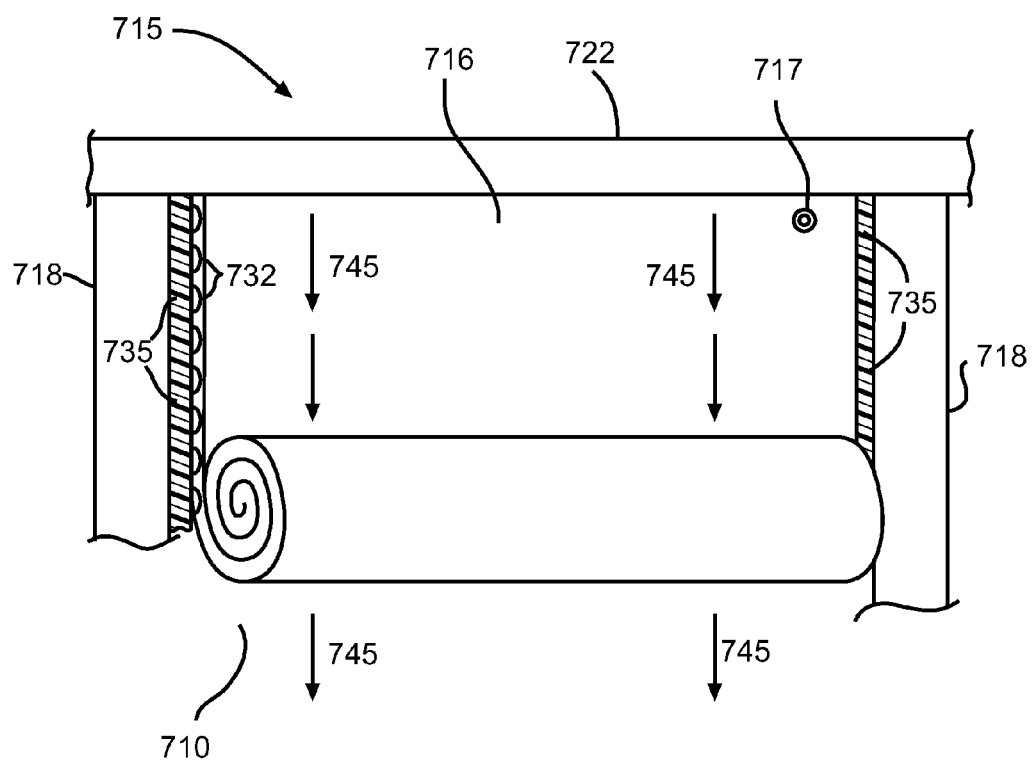
FIG. 10 shows an alternate embodiment of an envelope seal that unrolls during activation.

Referring now to FIG. 10, another embodiment of an envelope seal is shown generally at 715. The envelope seal 715 includes an envelope 716 that, in a retracted position, is in the form of a roll. The rolled envelope 716 is positioned between framing members 718 and fastened to an underside of a subfloor 722. While the illustrated embodiment shows a retracted envelope 716 in the form of a roll, it is within the contemplation of the invention that the retracted envelope 716 can take other forms, such as the non-limiting examples of a folded envelope or a bellows-style envelope.

Referring again to FIG. 10, the retracted (rolled) envelope 716 can include straps (not shown) or other desired structures, mechanisms or devices sufficient to facilitate fastening to the underside of the subfloor 722.

The envelope 716 includes a fitment port 717. The fitment port 717 is configured to facilitate injection of bulk foaming composition into the interior of the retracted envelope 716. In the embodiment illustrated in FIG. 10, the fitment port 717 is the same as, or similar to, the fitment port 217 illustrated in FIG. 5B and described above. In other embodiments, the fitment port 717 can be the same as, or similar to, the fitment port 417 illustrated in FIG. 8 and described above. In still other embodiments, the fitment port 717 can be different from the fitment ports 217 or 417. In still other embodiments, the envelope 716 can be of the "integral" type, as discussed above, thereby containing a quantity of a foaming composition that can be triggered internally or externally to initiate a foaming reaction internally within the envelope 716 to expand it to fill and seal a large gap 710.

In operation, the envelope 716, in the retracted and rolled configuration, is fastened to the underside of the subfloor 722. Foam is inserted into the interior of the rolled envelope 716 through the fitment port 717. The insertion of the foam urges the retracted envelope 716 to unroll in a generally downward direction as indicated by arrows 745. As the envelope 716 unrolls, the envelope 716 is acted upon by the expanding foam within the envelope 716 and also by the force of gravity, to fill the large gap 710 between the framing members 718 and the undersurface of the subfloor 722. In an expanded position, the envelope 716 is substantially within the same vertical plane as the framing members 718.

Optionally, the envelope 716 can contain strategic "leak" pores 732. The leak pores 732 are configured to allow the foam 735 to extrude in a controlled fashion to further seal the large gap 710 and secure the expanded envelope 716 in place between the framing members 718 and the undersurface of the subfloor 722. In the illustrated embodiment, the leak pores 732 are the same as, or similar to, the leak pores 632 illustrated in FIG. 9B and discussed above. Alternatively the leak pores 732 can be different from the leak pores 632.

Advantageously, the envelope seal 715 illustrated in FIG. 10 can be used with other types of framing members 718, including the non-limiting example structural (I-beam) joists.

As discussed above, spray foams have found widespread utility in the fields of insulation and structural reinforcement. For example, spray foams are commonly used to insulate or impart structural strength to items such as automobiles, hot tubs, refrigerators, boats, and building structures. In addition, spray foams are used in applications such as cushioning for furniture and bedding, padding for underlying carpets, acoustic materials, textile laminates, and energy absorbing materials. Spray foams are also used as insulators or sealants for home walls.

Figure 11A:
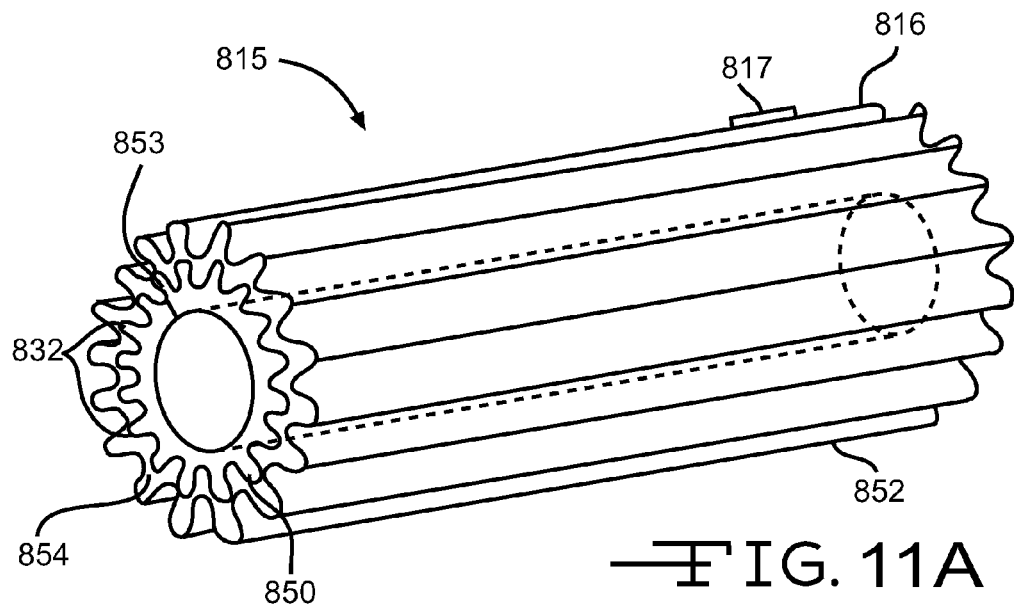
FIGS. 11A and 11B show an alternate embodiment of an envelope seal for use with pipe and ductwork.
Figure 11B:
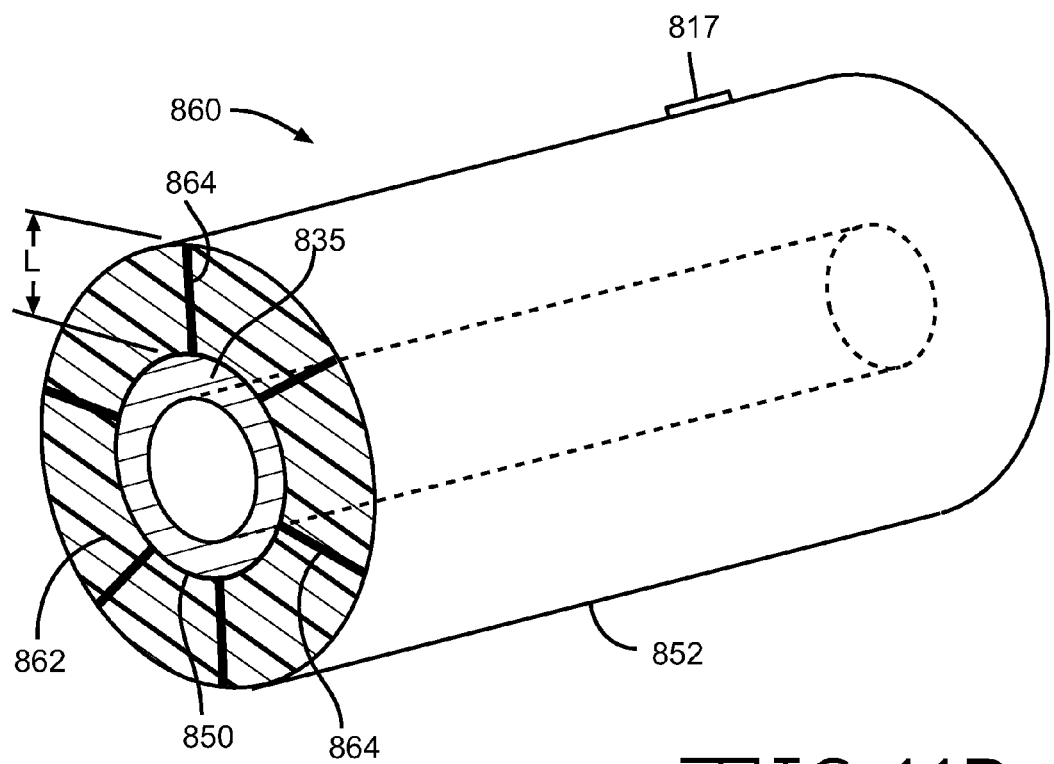

Referring now to FIGS. 11A and 11B, another embodiment of an envelope seal is shown generally at 815. In this embodiment, the envelope seal 815 is used to insulate pipe 853 or duct used in residential or industrial applications. Generally, the envelope 816 is configured to be wrapped around the pipe 853 and filled with foam.

Referring first to FIG. 11A, the envelope seal 815 includes an envelope 816 having an inner skin 850 and outer skin 852. In the illustrated embodiment, the inner and outer skins, 850, 852 are formed from the same material as used to form the envelope 116 as shown in FIG. 4B and discussed above. Alternatively, the inner and outer skins, 850, 852 can be formed from other materials. The inner skin 850 and outer skin 852 can include straps (not shown) or other structures, mechanisms or devices sufficient to facilitate fastening of the inner and outer skins, 850, 852, as the envelope is wrapped around the pipe 853. An interior space 854 extends between the inner skin 850 and the outer skin 852.

The envelope 816 includes a fitment port 817. The fitment port 817 is configured to facilitate injection of bulk foaming composition into the interior space 854 of the wrapped envelope 816. The fitment port 817 can take any of the forms discussed above.

In operation, the envelope 816 is wrapped around the pipe 853 such that longitudinal edges of the inner skin 850 are fastened together and longitudinal edges of the outer skin 852 are fastened together. In the wrapped position, the inner and outer skins, 850, 852 are configured to be "non-rigid" structures. The term "non-rigid", as used herein, is defined to mean that the inner and outer skins, 850, 852 are flexible and prior to the application of the foam and do not assume specific shapes. As shown in FIG. 11B, foam is inserted through the fitment port 817 and into the interior space 854 between the inner and outer skins 850, 852. The insertion of the foam provides pressure against the inner and outer skins, 850, 852 such as to form an insulation structure 860. The insulation structure 860 includes the inner and outer skins 850, 852 connected by a layer of foam 862 therebetween.

Referring again to FIG. 11B, optionally the inner and outer skins, 850, 852 can be connected to each other by a plurality of members 864 positioned within the interior space 854. The members 864 have a length L configured to define a thickness of the resulting layer of foam 862. By defining the thickness of the resulting layer of foam 862, the resulting insulative value R can be defined. In the illustrated embodiment, each of the members 864 has the same length L, thereby allowing the inner and outer skins 850, 852 to be concentric with respect to each other. In other embodiments, the members 864 can have different lengths, thereby allowing a non-concentric arrangement between the inner and outer skins 850, 852. While the embodiment illustrated in FIG. 11B shows the members 864 as having a radial orientation, it is within the contemplation of this invention that the members 864 can have other orientations or include other structures sufficient to connect the inner and outer skins, 850, 852 to each other.

Referring again to FIG. 11A, optionally, the envelope 816 can contain strategic "leak" pores 832. The leak pores 832 are configured to allow foam 835 to extrude from the inner skin 850 in a controlled fashion to further seal a gap between the inner skin 850 and the pipe 853, as shown in FIG. 11B. Further, the leak pores 832 are configured to position the resulting insulation structure 860 such as to be radially concentric about pipe 853. In the illustrated embodiment, the leak pores 832 are the same as, or similar to, the leak pores 632 illustrated in FIG. 9B and discussed above. Alternatively the leak pores 832 can be different from the leak pores 632.

While the resulting insulation structure 860 illustrated in FIG. 11B has a generally circular cross-sectional shape, it should be appreciated that in other embodiments, the resulting insulation structure can be configured to have other cross-sectional shapes, such as the non-limiting example of a square cross-sectional shape. Advantageously, the envelope seal 815 illustrated in FIGS. 11A and 11B can have any desired length.

While the embodiment illustrated in FIGS. 11A and 11B has been described above as incorporating a non-rigid inner and outer skin, 850 and 852, it is within the contemplation of this invention that the inner and/or outer skins could be formed from materials or combinations of materials resulting in rigid structures. The term "rigid", as used herein, is defined to mean that the inner and outer skins are inflexible prior to the application of the foam and can have specific shapes. As one non-limiting example of the inner and outer skins having a rigid structure, the inner and/or outer skins could have the form of a clam-shell like structure, wherein the structure is hinged along one longitudinal edge.

As discussed above, the foams that may be used within an envelope may be of any of the known types of foaming compositions, including both open and closed cell foams. In other embodiments incorporating any of the envelopes 116, 216, 316, 416, 516, 616, 716 and 816 discussed above, the foaming composition can include ceramic foam. The term "ceramic foam", as used herein, is defined to include any foam component or material utilizing a ceramic material, such as the non-limiting example of aluminum oxide. In certain embodiments, the ceramic foam can be used within the envelopes 116, 216, 316, 416, 516, 616, 716 and 816 in any of the manners discussed above. Alternatively, the ceramic foam can be used within the 116, 216, 316, 416, 516, 616, 716 and 816 using other methods and techniques.

As also discussed above, when filled with the foam, the envelopes 116, 216, 316, 416, 516, 616, 716 and 816 stretch to expand and conform to the volume space it is designed to fill. In another embodiment, the foam configured to fill the envelopes 116, 216, 316, 416, 516, 616, 716 and 816 can include an additive or additives configured to dissolve the envelope in a controlled manner, such as to allow the expanding foam to form an intimate seal with the structure surrounding the volume space. The expansion of the foam within the controlled manner allows the foam to generally retain the shape of the envelope until the foam seals with the surrounding structure. Any desired additive can be used.

Figure 12:
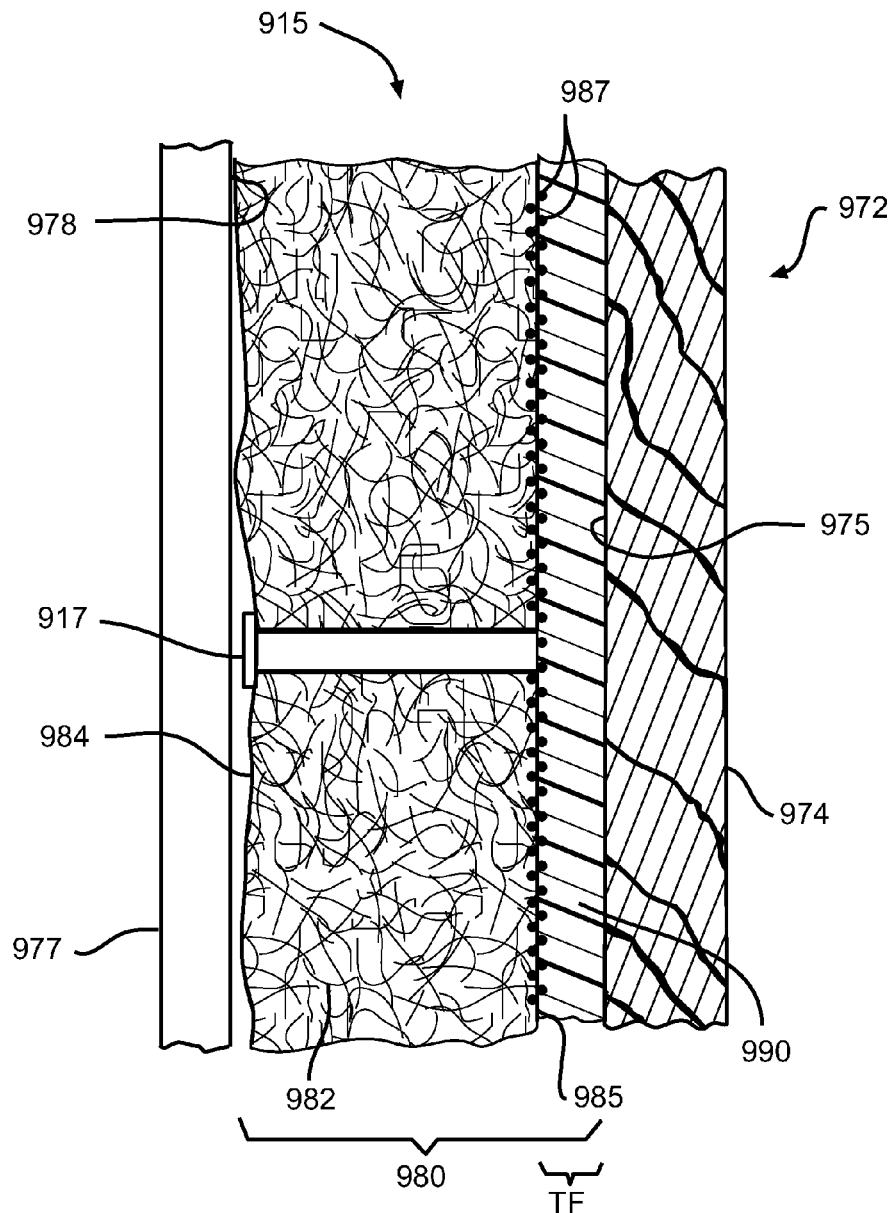
FIG. 12 shows an alternate embodiment of an envelope seal for use with insulative batts.

While the embodiments discussed above have been illustrated and described as foaming compositions contained in envelopes or bags, it should be appreciated that in other embodiments, the foaming compositions can be configured with other structures, mechanisms and devices. Referring now to FIG. 12, another sealing embodiment is shown generally at 915. Generally, this embodiment involves the forming of a foam-based seal between the outboard side of a fibrous batt and the inboard side of an exterior panel.

Referring again to FIG. 12, a portion of a building sidewall 972 is illustrated. The sidewall 972 is configured to define interior space within the building and to support additional structural components. The sidewall 972 can be formed from various structural framing members, such as the non-limiting examples of bottom plates (not shown), top plates (not shown) and studs (not shown) extending therebetween. The bottom plates, top plates and studs can be configured to provide surfaces to which additional framing members or wall panels can be attached. In certain embodiment, the various structural framing members are made of wood. In other embodiments, the various structural framing members can be made of other desired materials, including the non-limiting example of steel. The various structural framing members can have any desired dimensions.

Referring again to FIG. 12, the exterior of the sidewall 972 is covered by an exterior sheathing 974 attached to the various structural framing members. The exterior sheathing 974 is configured to provide rigidity to the sidewall 972 and also configured to provide a surface for an exterior wall covering (not shown). In the illustrated embodiment, the exterior sheathing 974 is made of oriented strand board (OSB). In other embodiments, the exterior sheathing 974 can be made of other materials, such as for example plywood, waferboard, rigid foam or fiberboard, sufficient to provide rigidity to the sidewall 972 and to provide a surface for an exterior wall covering. As shown in FIG. 12, the exterior sheathing 974 has an interior surface 975.

The interior of the sidewall can be covered by construction material 977. The construction material 977 can be any desired material or combination of materials, including the non-limiting examples of drywall and paneling. The construction materials 977 have an exterior surface 978.

Insulation cavities 980 can be formed in the spaces between the various structural framing members, the interior surface 975 of the exterior sheathing 974 and the exterior surface 978 of the construction material 977. The term "insulation cavity" as used herein, is defined to mean any space within the building within which insulation is desired, including the non-limiting examples of a building attic or sidewalls. In certain embodiments, the insulation cavities 980 can extend from the bottom plate to the top plate. In other embodiments, the insulation cavities 980 can extend from the bottom plate or the top plate to a building fixture, such as for example a window (not shown). While the insulation cavity 980 illustrated in FIG. 12 is shown as being located in the sidewall 972 of a building, it should be appreciated that other insulation cavities can occur in other locations of the building, such as the non-limiting example of an attic space. The insulation cavities 980 can have any size, shape or configuration and can be formed between any building components or members.

Referring again to FIG. 12, an insulative batt 982 can be positioned within the insulation cavity 980. The insulation batt 982 is typically fibrous glass having a density within the range of from about 0.3 to about 1.5 pounds per cubic foot (pcf), although other densities can be used. Also, other fibers, such as mineral fibers of rock, slag or basalt, can be used as well as organic fibers, such as the polymer fibers polypropylene, polyester and polysulfide. In certain embodiments, the fibers can be, but not necessarily, bonded together with a binder material, such as a urea phenol-formaldehyde commonly used with fiberglass insulation, to provide stiffness to the insulative batt 982. It will be appreciated that any binder material suitable for bonding the fibers together may be used. The insulative batt 982 can be installed in the insulation cavity 980 in any desired manner.

The insulative batt 982 includes an interior surface 984, positioned to be adjacent the exterior side 978 of the construction material 977, and an exterior surface 985, positioned to be adjacent the interior surface 975 of the exterior sheathing 974.

In this embodiment, the exterior surface 985 of the insulative batt 982 has been fused with a first component 987 of a two part foaming composition, as described above. The first component 987 can either be the "A" side of the foaming composition or the "B" side of the foaming composition. In certain embodiments, the first component 987 can be fused to the exterior surface 985 of the insulative batt 982 by an adhesive. Alternatively, the first component 987 can be fused to the exterior surface 985 of the insulative batt 982 by other methods, including the non-limiting examples of heating or sonic welding.

The insulative batt 982 includes a fitment port 917 that extends from the interior surface 984 of the insulative batt 982 to the exterior surface 985 of the insulative batt 982. The fitment port 917 is configured to facilitate injection of a second component of the foaming composition to the exterior surface 985 of the insulative batt 982. The fitment port 917 can take any of the forms discussed above. While the embodiment shown in FIG. 12 illustrates an insulative batt 982 having a single fitment port 917, it should be appreciated that in other embodiments, the insulative batt 982 can have more than one fitment port 917.

In operation, the sidewall 972 is constructed using the various structural framing members. The exterior sheathing 974 is fastened to structural framing members. Insulative batts 982 are positioned within the insulation cavities 980 formed by the various structural framing members and the exterior sheathing 974. The exterior surface 985 of the insulative batts 982 includes a first component 987 of the foaming composition. The second component of the foaming composition is piped, via the fitment port 917, through the body of the insulative batt 982, to the exterior surface 985 of the insulative batt 982, such as to come into contact with, and react with the first component 987, thereby forming a layer of foam composition 990. The layer of foam composition 990 extends the length of the insulative batt 982 from the exterior surface 985 of the insulation batt 982 to the interior surface 975 of the exterior sheathing, wherein the foam composition 990 forms an intimate seal with the exterior sheathing 974. The layer of foam composition 990 has a thickness TF. In the illustrated embodiment, the thickness of the layer of foam composition is in a range of from about 0.1 inches to about 0.3 inches. In other embodiments, the layer of foam composition can be less than about 0.1 inches or more than about 0.3 inches. After the foam composition 990 is formed, the construction material 977 can be fastened to the various structural framing materials as discussed above.

While the embodiment illustrated in FIG. 12 has been described above as forming foam composition by piping a second component through the fitment port 917 such as to react with the first component 987 fused to the exterior surface 985 of the insulative batt 982, it should be appreciated that in other embodiments, a pre-mixed foam composition can be piped through the fitment port 917. The pre-mixed foam composition can extend from the exterior surface 985 of the insulation batt 982 to the interior surface 975 of the exterior sheathing, wherein the foam composition forms an intimate seal with the exterior sheathing 974.

While the embodiment illustrated in FIG. 12 was described above as forming foam composition along the length of the insulative batt 982, in other embodiments only the side surfaces (not shown) of the insulative batt 982 are fused with the first component 987 of the foam composition. In these embodiments, piping a second component through the fitment port 917 allows a reaction with the first component 987 such as to form an intimate seal between the side surfaces of the insulation batt 982 and the interior surface (not shown) of the various structural framing members. The layer of foam composition formed along the side surfaces of the insulative batts 982 can have any desired thickness.

Figure 13:
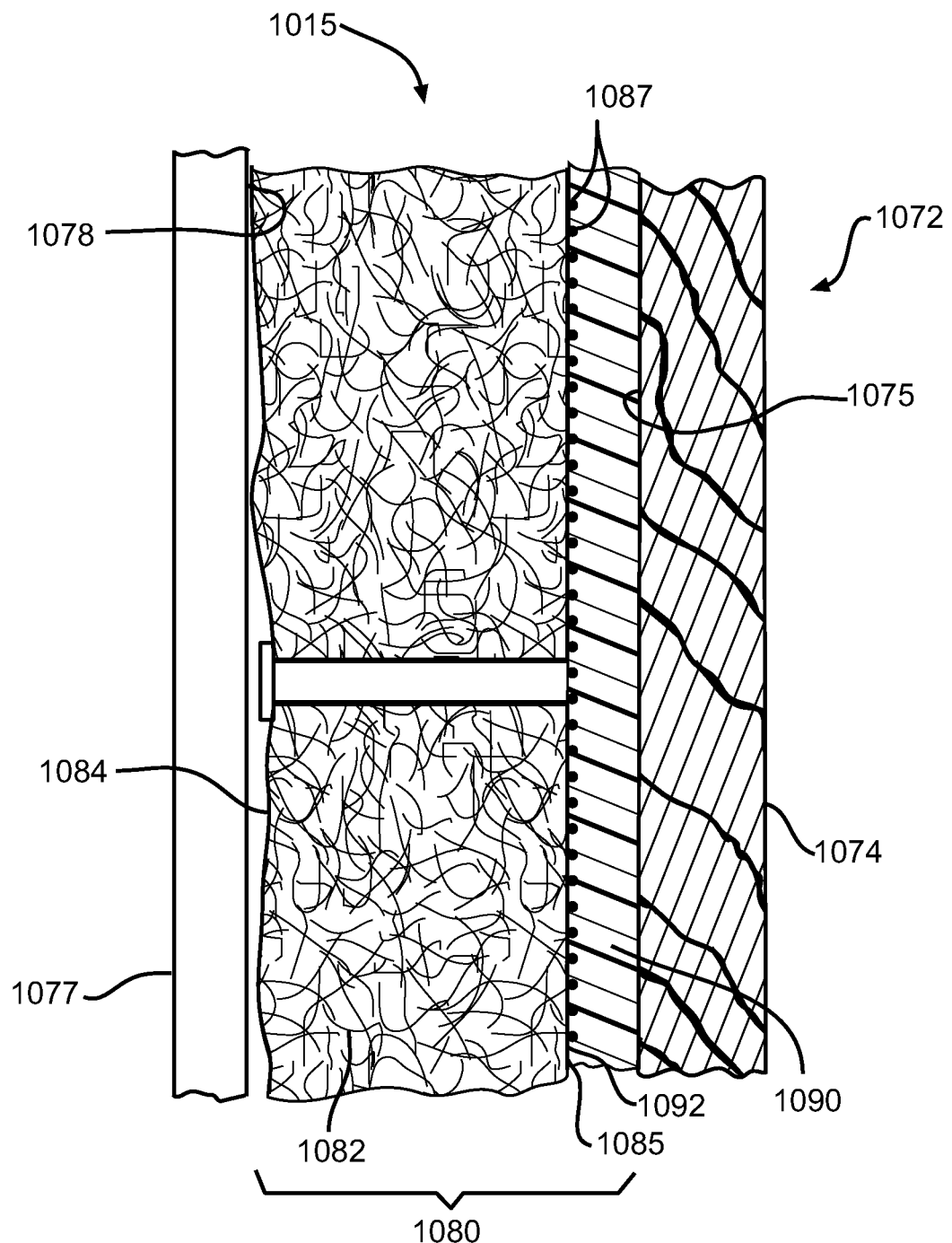
FIG. 13 shows an alternate embodiment of an envelope seal for use with an insulation batt having a facing material.

Another sealing embodiment utilizing a foam composition with an insulative batt is illustrated in FIG. 13 generally at 1015. Generally, this embodiment involves the use of a facing material on the insulative batt. The facing materials acts as a barrier to prevent the foam composition from penetrating the fibers of the insulative batt as the foam composition forms a seal between the outboard side of a fibrous batt and the inboard side of an exterior panel.

Referring again to FIG. 13, a portion of a building sidewall 1072 is illustrated. The sidewall 1072 includes various structural framing members (not shown), an exterior sheathing 1074 attached to the various structural framing members, construction material 1077, insulation cavity 1080 and an insulative batt 1082 positioned within the insulation cavity 1080. In the illustrated embodiment, the various structural framing members, exterior sheathing 1074, construction material 1077, insulation cavity 1080 and insulative batt 1082 are the same as, or similar to, the various structural framing members, exterior sheathing 974, construction material 977, insulation cavity 980 and insulative batt 982 illustrated in FIG. 12 and described above. In other embodiments, the various structural framing members, exterior sheathing 1074, construction material 1077, insulation cavity 1080 and insulative batt 1082 can be different from the various structural framing members, exterior sheathing 974, construction material 977, insulation cavity 980 and insulative batt 982 illustrated in FIG. 12 and described above.

As shown in FIG. 13, the exterior sheathing 1074 has an interior surface 1075 and the construction material 1077 has an exterior surface 1078.

The insulative batt 1082 includes an interior surface 1084, positioned to be adjacent the exterior side 1078 of the construction material 1077, and an exterior surface 1085, positioned to be adjacent the interior surface 1075 of the exterior sheathing 1074.

In this embodiment, the exterior surface 1085 of the insulative batt 1082 includes a facing material 1092. The facing material 1092 is configured to prevent a foam composition 1090 from penetrating the fibers of the insulative batt 1082 as the foam composition 1090 forms a seal between the facing material 1092 of the insulative batt 1082 and the exterior panel 1074. In the illustrated embodiment, the facing material 1092 is made from a polymeric material such as the non-limiting example of polyfilm and has a thickness in a range of from about 2.0 mils to about 10.0 mils. In other embodiments, the facing material 1092 can be made from other materials, such as for example, spunbonded olefin or other synthetic material made of high-density polyethylene fibers and can have a thickness less than about 2.0 mils or more than about 10.0 mils.

Referring again to FIG. 13, the facing material 1092 has been fused with a first component 1087 of a two part foaming composition.

In operation, a second component of the foaming composition is piped through the body of the insulative batt 1082, to the exterior surface 1085 of the insulative batt 1082, such as to come into contact with, and react with the first component 1087, thereby forming a layer of foam composition 1090 as described above for FIG. 12. The layer of foam composition 1090 extends from the exterior surface of the facing material 1092 to the interior surface 1075 of the exterior sheathing, wherein the foam composition forms an intimate seal with the exterior sheathing 1074.

Similar to the embodiment illustrated in FIG. 12, it should be appreciated that in other embodiments, a pre-mixed foam composition can be used to form the foam composition 1090.

Figure 14:
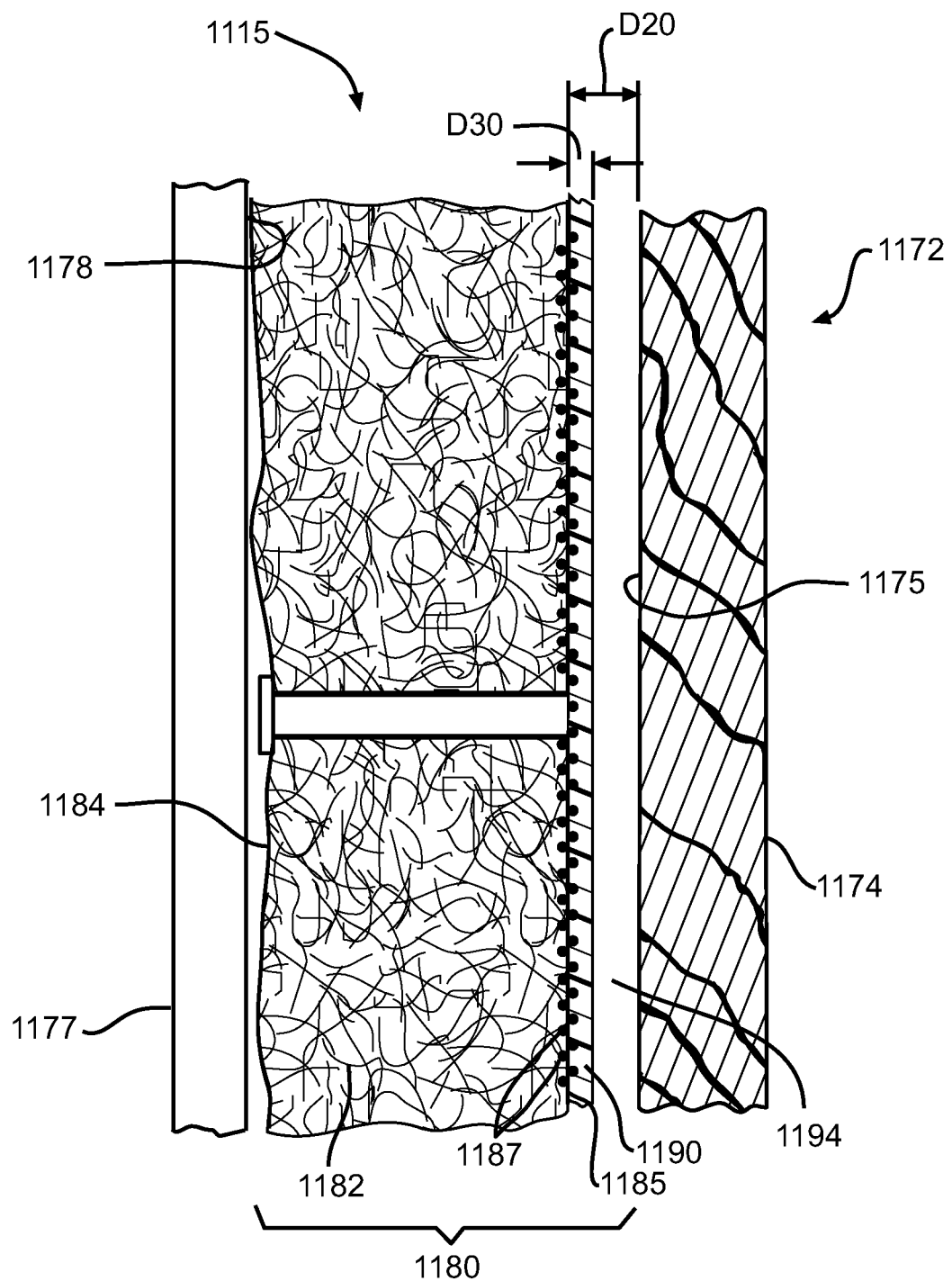
FIG. 14 shows an alternate embodiment of an envelope seal for use with an insulation batt forming an air space between the insulation batt and an exterior sheathing.

Another sealing embodiment utilizing a foam composition with an insulative batt is illustrated in FIG. 14 generally at 1115. Generally, this embodiment involves the use of an air space formed between a layer of foam composition on the insulative batt and the exterior sheathing. The air space acts as an insulative layer.

Referring again to FIG. 14, a portion of a building sidewall 1172 is illustrated. The sidewall 1172 includes various structural framing members (not shown), an exterior sheathing 1174 attached to the various structural framing members, construction material 1177, insulation cavity 1180 and an insulative batt 1182 positioned within the insulation cavity 1180. In the illustrated embodiment, the various structural framing members, exterior sheathing 1174, construction material 1177, insulation cavity 1180 and insulative batt 1182 are the same as, or similar to, the various structural framing members, exterior sheathing 974, construction material 977, insulation cavity 980 and insulative batt 982 illustrated in FIG. 12 and described above. In other embodiments, the various structural framing members, exterior sheathing 1174, construction material 1177, insulation cavity 1180 and insulative batt 1182 can be different from the various structural framing members, exterior sheathing 974, construction material 977, insulation cavity 980 and insulative batt 982 illustrated in FIG. 12 and described above.

As shown in FIG. 14, the exterior sheathing 1174 has an interior surface 1175 and the construction material 1177 has an exterior surface 1178.

The insulative batt 1182 includes an interior surface 1184, positioned to be adjacent the exterior side 1178 of the construction material 1177, and an exterior surface 1185, positioned to be a distance D20 from the interior surface 1175 of the exterior sheathing 1174. In the illustrated embodiment, the distance D20 is in a range of from about 0.3 inches to about 1.0 inches. In other embodiments, the distance D20 can be less than about 0.3 inches or more than about 1.0 inches.

In this embodiment, the exterior surface 1185 of the insulative batt 1182 has been fused with a first component 1187 of a two part foaming composition.

In operation, a second component of the foaming composition is piped through the body of the insulative batt 1182, to the exterior surface 1185 of the insulative batt 1182, such as to come into contact with, and react with the first component 1187, thereby forming a layer of foam composition 1190 as described above for FIG. 12. The layer of foam composition 1190 extends from the exterior surface 1185 of the insulative batt 1182 toward the exterior sheathing 1174 a distance D30. In the illustrated embodiment, the distance D30 is in a range of from about 0.1 inches to about 0.3 inches. In other embodiments, the distance D30 can be less than about 0.1 inches or more than about 0.3 inches.

As shown in FIG. 14, an air gap 1194 is formed between the layer of foam composition 1190 and the interior surface 1175 of the exterior sheathing 1174. The air gap 1194 is configured to add to the insulative value of the insulative seal 1115. A thickness of the air gap 1194 can be determined from the difference between the distance D20 and the distance D30. In the illustrated embodiment, the thickness of the air gap 1194 is in a range of from about 0.2 inches to about 0.8 inches. Alternatively, the thickness of the air gap 1194 can be less than about 0.2 inches or more than about 0.8 inches.

Similar to the embodiment illustrated in FIG. 12, it should be appreciated that in other embodiments, a pre-mixed foam composition can be used to form the foam composition 1190.

The invention of this application has been described above both generically and with regard to specific embodiments, although a wide variety of alternatives known to those of skill in the art can be selected within the generic disclosure. The invention is not otherwise limited, except for the recitation of the claims set forth below.

What is claimed is:

1. A system for sealing or insulating a large volume, the system comprising:
   an envelope having walls defining an interior, the interior configured to receive a foaming composition, the envelope initially configured in a retracted configuration; and
   a foaming composition configured for insertion into the interior of the envelope, the foaming composition comprising ceramic foam;
   wherein the envelope is configured such that the foaming composition expands the envelope such as to fill a large gap.

2. The system of claim 1, wherein the envelope has the shape of a roll in the retracted configuration.

3. The system of claim 2, wherein the envelope is configured such that the force of gravity also acts to unroll the envelope.

4. The system of claim 1, wherein the envelope includes a series of leak pores configured to allow the foaming composition to escape the interior of the envelope to assist in sealing the large volume.

5. The system of claim 1, wherein the foaming composition is configured to dissolve the envelope.

6. A system for sealing or insulating a pipe or ductwork, the system comprising:
   an envelope having an inner skin and an outer skin configured for wrapping around the pipe or ductwork, the inner skin and the outer skin defining an interior, the interior configured to receive a foaming composition, the envelope initially configured in a non-rigid structure; and
   a foaming composition configured for insertion into the interior of the envelope, the foaming composition comprising ceramic foam;
   wherein the envelope is configured such that the foaming composition expands the envelope such as to form a insulation structure around the pipe or ductwork.

7. The system of claim 6, wherein the envelope extends substantially the lengths of the pipe or ductwork.

8. The system of claim 6, wherein the inner skin and the outer skin are connected to each other by a plurality of members.

9. The system of claim 6, wherein the inner skin and the outer skin of the insulation structure are concentric about the pipe.

10. The system of claim 6, wherein the inner skin includes a series of leak pores configured to allow the foaming composition to escape the interior of the envelope to assist in sealing the pipe or ductwork.

11. The system of claim 6, wherein the foaming composition is configured to dissolve the envelope.

12. A system for sealing or insulating an insulation cavity formed between internal and external materials, the system comprising:
   an insulative batt positioned between the internal and external materials, the insulative batt having a first component of a foaming composition fused to a surface of the insulative batt adjacent the external material; and
   a fitment port configured to extend through the insulative batt and further configured to facilitate injection of a second component of the foaming composition;
   wherein the first component of the foaming composition is configured to react with the second component of the foaming composition such as to form a layer of foam composition that seals with the exterior material.

13. The system of claim 12, wherein the layer of foam composition is in a range of from about 0.1 inches to about 0.3 inches.

14. The system of claim 12, wherein the first component of the foaming composition is fused to a facing material.

15. The system of claim 12, wherein an air gap is formed between the layer of foam composition and the external materials.

16. The system of claim 15, wherein the air gap has a thickness in a range of from about 0.2 inches to about 0.8 inches.

17. A system for sealing or insulating an insulation cavity formed between internal and external materials, the system comprising:
   an insulative batt positioned between the internal and external materials, the insulative batt having a surface positioned adjacent the external material; and
   a fitment port configured to extend through the insulative batt and further configured to facilitate injection of a foaming composition;
   wherein the foaming composition is configured to form a layer of foam composition that seals the insulative batt with the exterior material.

18. The system of claim 17, wherein the layer of foam composition is in a range of from about 0.1 inches to about 0.3 inches.

19. The system of claim 17, wherein the insulative batt includes a facing material, and wherein the foaming composition is configured to form a layer of foam composition that seals the insulative batt with the exterior material.

20. The system of claim 17, wherein an air gap is formed between the layer of foam composition and the external material.

21. The system of claim 20, wherein the air gap has a thickness in a range of from about 0.2 inches to about 0.8 inches.

22. A system for sealing or insulating a large volume, the system comprising:
   an envelope having walls defining an interior, the interior configured to receive a foaming composition, the envelope initially configured in a retracted configuration; and
   a foaming composition configured for insertion into the interior of the envelope, wherein the foaming composition is configured to dissolve the envelope;
   wherein the envelope is configured such that the foaming composition expands the envelope such as to fill a large gap.

23. The system of claim 22, wherein the envelope has the shape of a roll in the retracted configuration.

24. The system of claim 23, wherein the envelope is configured such that the force of gravity also acts to unroll the envelope.

25. The system of claim 22, wherein the envelope includes a series of leak pores configured to allow the foaming composition to escape the interior of the envelope to assist in sealing the large volume.

26. A system for sealing or insulating a pipe or ductwork, the system comprising:
   an envelope having an inner skin and an outer skin configured for wrapping around the pipe or ductwork, the inner skin and the outer skin defining an interior, the interior configured to receive a foaming composition, the envelope initially configured in a non-rigid structure; and
   a foaming composition configured for insertion into the interior of the envelope, wherein the foaming composition is configured to dissolve the envelope;
   wherein the envelope is configured such that the foaming composition expands the envelope such as to form a insulation structure around the pipe or ductwork.

27. The system of claim 26, wherein the envelope extends substantially the lengths of the pipe or ductwork.

28. The system of claim 26, wherein the inner skin and the outer skin are connected to each other by a plurality of members.

29. The system of claim 26, wherein the inner skin and the outer skin of the insulation structure are concentric about the pipe.

30. The invention of claim 26, wherein the inner skin includes a series of leak pores configured to allow the foaming composition to escape the interior of the envelope to assist in sealing the pipe or ductwork.

* * * * *